(12) United States Patent
Irie et al.

(10) Patent No.: US 8,738,234 B2
(45) Date of Patent: May 27, 2014

(54) VEHICLE MOVEMENT ACTUATOR CONTROLLER USING TRAVEL CONDITION DETECTOR INPUT

(75) Inventors: Yoshiaki Irie, Chiryu (JP); Yoshiko Kojima, Nagoya (JP); Junichi Meguro, Nagoya (JP); Kojiro Takeyama, Aichi-gun (JP); Yoshikazu Hattori, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/574,174

(22) PCT Filed: Feb. 25, 2011

(86) PCT No.: PCT/IB2011/000387
§ 371 (c)(1),
(2), (4) Date: Jul. 19, 2012

(87) PCT Pub. No.: WO2011/110913
PCT Pub. Date: Sep. 15, 2011

(65) Prior Publication Data
US 2012/0323473 A1    Dec. 20, 2012

(30) Foreign Application Priority Data
Mar. 12, 2010  (JP) ................................ 2010-056412

(51) Int. Cl.
*G05D 1/02*    (2006.01)

(52) U.S. Cl.
USPC ............... 701/48; 701/41; 701/117; 701/300; 701/301; 340/435; 340/905

(58) Field of Classification Search
USPC ............ 340/435, 905; 701/41, 117, 300, 301, 701/48; 188/350
See application file for complete search history.

(56) References Cited

U.S. PATENT DOCUMENTS 5,594,645 A * 1/1997 Nishimura et al. ............ 701/96
5,854,987 A * 12/1998 Sekine et al. .................. 701/41

(Continued)

FOREIGN PATENT DOCUMENTS

DE    10 2005 002 719 A1    8/2006
DE    10 2007 029 909 A1    1/2009

(Continued)

OTHER PUBLICATIONS

Coue et al., "Multi-Sensor Data Fusion Using Bayesian Programming: an Automotive Application," Proceedings of IEEE, Oct. 2002, pp. 141-146.

(Continued)

*Primary Examiner* — Helal A Algahaim
*Assistant Examiner* — Donald J Wallace
(74) *Attorney, Agent, or Firm* — Oliff PLC

(57) ABSTRACT

A vehicle control device includes travel condition detection devices configured to detect conditions around a vehicle and performs travel control of the vehicle according to the conditions around the vehicle by controlling a plurality of actuators according to information detected by the travel condition detection devices. The vehicle control device has a plurality of the travel condition detection devices. A control amount of at least one of the actuators, from among the plurality of actuators, is restricted according to reliability of a plurality of pieces of the information detected by the plurality of travel condition detection devices.

10 Claims, 23 Drawing Sheets

(56) References Cited

U.S. PATENT DOCUMENTS

| | | | |
|---|---|---|---|
| 6,170,600 B1* | 1/2001 | Shimizu | 701/41 |
| 6,308,123 B1* | 10/2001 | Ikegaya et al. | 701/41 |
| 6,463,369 B2* | 10/2002 | Sadano et al. | 701/41 |
| 7,454,291 B2* | 11/2008 | Kawakami et al. | 701/301 |
| 7,640,108 B2* | 12/2009 | Shimizu et al. | 701/301 |
| 8,086,372 B2* | 12/2011 | Okuda et al. | 701/41 |
| 8,306,700 B2* | 11/2012 | Kobayashi | 701/48 |
| 8,515,615 B2* | 8/2013 | Taguchi | 701/301 |
| 2006/0212222 A1* | 9/2006 | Miyoshi et al. | 701/301 |
| 2007/0168128 A1 | 7/2007 | Tokoro et al. | |
| 2007/0203617 A1* | 8/2007 | Haug | 701/41 |
| 2009/0009305 A1* | 1/2009 | Kataoka et al. | 340/435 |
| 2009/0251355 A1* | 10/2009 | Nanami | 342/27 |
| 2010/0099353 A1* | 4/2010 | Komori | 701/300 |
| 2011/0032119 A1* | 2/2011 | Pfeiffer et al. | 340/905 |
| 2011/0060524 A1* | 3/2011 | Miyajima et al. | 701/300 |

FOREIGN PATENT DOCUMENTS

| | | |
|---|---|---|
| DE | 10 2007 034 196 A1 | 1/2009 |
| DE | 10 2007 062 698 A1 | 7/2009 |
| JP | A-2005-239114 | 9/2005 |
| JP | A-2006-96319 | 4/2006 |
| JP | A-2006-117232 | 5/2006 |
| JP | A-2007-176265 | 7/2007 |
| JP | A-2007-204044 | 8/2007 |
| JP | A-2008-129804 | 6/2008 |
| JP | A-2008-247385 | 10/2008 |
| JP | A-2008-250879 | 10/2008 |

OTHER PUBLICATIONS

International Search Report issued in International Patent Application No. PCT/IB2011/000387 dated Jul. 11, 2011.

Written Opinion of the International Searching Authority issued in International Patent Application No. PCT/IB2011/000387 dated Jul. 11, 2011.

International Preliminary Report on Patentability issued in International Patent Application No. PCT/IB2011/000387 dated Apr. 20, 2012.

* cited by examiner

VEHICLE MOVEMENT ACTUATOR CONTROLLER USING TRAVEL CONDITION DETECTOR INPUT

BACKGROUND OF THE INVENTION

1. Field of the Invention

The invention relates to a vehicle control device.

2. Description of the Related Art

In a vehicle control device of the related art, a control has been developed that causes the vehicle to travel automatically in order to facilitate driving when the vehicle travels and reduce a driving load on the driver. For example, in a travel control plan generating system described in Japanese Patent Application Publication 2008-129804 (JP-A-2008-129804), travel planning is performed by including a travel trajectory or speed pattern of a vehicle and also including a travel trajectory of a peripheral vehicle, thereby enabling automatic traveling that is flexibly adapted to variations in conditions of surrounding environment, while satisfying the travel objectives of the host vehicle.

In this case, when the control is performed to cause the vehicle to travel automatically, various types of information are detected with detection means such as sensors that detect the position of the host vehicle and surrounding environment, but reliability of these detection means during detection changes depending on the state in which each type of information is detected. When reliability of the detection means thus changes, reliability attained when the travel control of the vehicle is performed is decreased and adequate travel control is sometimes difficult to perform.

SUMMARY OF INVENTION

The invention provides a vehicle control device capable of performing vehicle travel control with better accuracy.

One aspect of the invention relates to a vehicle control device including travel condition detection means for detecting conditions around a vehicle, the vehicle control device performing travel control of the vehicle according to the conditions around the vehicle by controlling a plurality of actuators that enable the vehicle to travel according to information detected by the travel condition detection means, wherein the travel condition detection means is provided in plurality, and a control amount of at least one of the actuators, from among the plurality of actuators, is restricted according to reliability of a plurality of pieces of the information detected by the plurality of travel condition detection means.

In the vehicle control device according to the aforementioned aspect, a control amount of at least one of the actuators, from among the plurality of actuators, may be restricted according to reliability of a plurality of pieces of the information detected by the plurality of travel condition detection means, when the reliability of the information is low.

In the vehicle control device according to the aforementioned aspect, when a control amount of at least one of the actuators is restricted according to reliability of a plurality of pieces of the information detected by the plurality of travel condition detection means, a control amount of another actuator, from among the plurality of actuators, may be increased.

In the vehicle control device according to the aforementioned aspect, when a control amount of at least one of the actuators is restricted according to reliability of a plurality of pieces of the information detected by the plurality of travel condition detection means, the actuator for which the control amount is restricted may be changed according to the travel condition detection means that has detected the information.

In the vehicle control device according to the aforementioned aspect, when the reliability of the information detected by at least one of the travel condition detection means, from among the plurality of travel condition detection means, is low, a control amount of at least one of the actuators may be restricted so as to restrict the travel control of the vehicle in a direction in which the information with low reliability is detected by the at least one of the travel condition detection means.

The vehicle control device according to the aforementioned aspect may further include a travelable region derivation unit that derives a region in which the vehicle can travel around the vehicle, wherein the travelable region derived by the travelable region derivation unit may be changed according to reliability of a plurality of pieces of the information detected by the plurality of travel condition detection means, and a control amount of at least one of the actuators may be restricted so as to restrict the travel control of the vehicle according to the travelable region.

In the vehicle control device according to the aforementioned aspect, the plurality of travel condition detection means may include at least transverse condition detection means for measuring a position of the vehicle in a transverse direction, and a control amount of the actuator, from among the plurality of actuators, that performs travel control of the vehicle in the transverse direction may be restricted when reliability of the information detected by the transverse condition detection means is low.

In the vehicle control device according to the aforementioned aspect, when a control amount of the actuator that performs travel control of the vehicle in the transverse direction is restricted due to the low reliability of the information detected by the transverse condition detection means, a control amount of the actuator, from among the plurality of actuators, that performs travel control of the vehicle in a longitudinal direction may be increased.

In the vehicle control device according to the aforementioned aspect, the plurality of travel condition detection means may include at least longitudinal condition detection means for measuring a position of the vehicle in a longitudinal direction, and a control amount of the actuator, from among the plurality of actuators, that performs travel control of the vehicle in the longitudinal direction may be restricted when reliability of the information detected by the longitudinal condition detection means is low.

In the vehicle control device according to the aforementioned aspect, when a control amount of the actuator that performs travel control of the vehicle in the longitudinal direction is restricted due to the low reliability of the information detected by the longitudinal condition detection means, a control amount of the actuator, from among the plurality of actuators, that performs travel control of the vehicle in the transverse direction may be increased.

The vehicle control device in accordance with the invention is capable of performing vehicle travel control with better accuracy.

BRIEF DESCRIPTION OF DRAWINGS

The foregoing and/or further objects, features and advantages of the invention will become more apparent from the following description of example emboidments with reference to the accompanying drawings, in which like numerals are used to represent like elements, and wherein.

DETAILED DESCRIPTION OF EMBODIMENTS

An embodiment of the vehicle control device according to the invention will be described below in greater detail with reference to the appended drawings. The embodiment places no limitation on the invention. The constituent elements in the below-described embodiment include those readily replaceable by a person skilled in the art or those substantially identical thereto.

Figure 1:
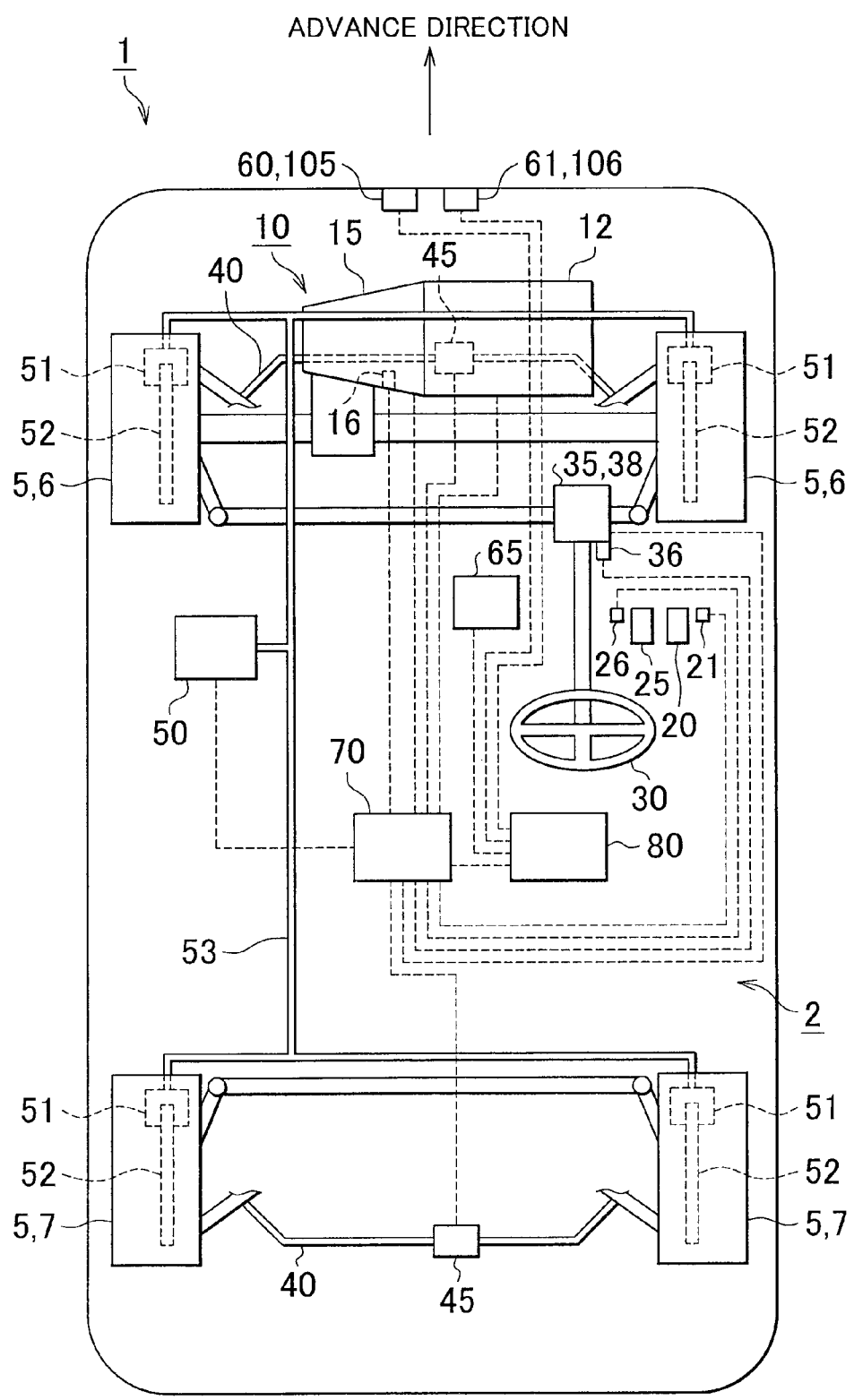
FIG. 1 is a schematic diagram of a vehicle provided with a vehicle control device of an embodiment of the invention.

FIG. 1 is a schematic diagram of a vehicle provided with a vehicle control device of an embodiment of the invention. A vehicle 1 including a vehicle control device 2 of the present embodiment carries an engine 12 that is an internal combustion engine as a power source and can travel by using the power of the engine 12. An automatic transmission 15, which is an example of a transmission device, is connected to the engine 12, and the power generated by the engine 12 can be transmitted to the automatic transmission 15. The automatic transmission 15 has a plurality of gear stages with different shift ratios, and the power converted by the automatic transmission 15 is transmitted as drive power to left and right front wheels 6 provided as drive wheels, from among the wheels 5 of the vehicle 1, via a power transmission train. As a result, the vehicle 1 can travel. A device that can transmit drive power to the front wheels 6, which are the drive wheels, such as the engine 12 and the automatic transmission 15, is provided as a drive device 10. The automatic transmission 15 constituting the drive device 10 is provided with a vehicle speed sensor 16, which is vehicle speed detection means capable of detecting the vehicle speed by detecting the revolution speed of an output shaft (not shown in the figure) of the automatic transmission 15.

Further, the vehicle 1 is also provided with an accelerator pedal 20 and a brake pedal 25 that are used when the driver operates the vehicle, and an accelerator depression amount sensor 21 and a brake sensor 26 are provided to detect the operation amounts of these pedals.

The vehicle 1 including the vehicle control device 2 of the present embodiment is the so-called front wheel drive vehicle in which the power generated by the engine 12, is transmitted to the front wheels 6 and the drive power is generated at the front wheels 6, but the vehicle 1 may be of a drive system other than the front wheel drive system, for example, a rear wheel drive vehicle in which the drive power is generated at rear wheels 7 or a four wheel drive vehicle in which the drive power is generated at all of the wheels 5. Further, the engine 12 may be a spark-ignition internal combustion engine of a reciprocating system or a compression-ignition internal combustion engine of a reciprocating system. The drive device 10 may also use a power source other than the internal combustion engine. For example, an electric drive device 10 using an electric motor as a power source or a hybrid drive device 10 using both the engine 12 and an electric motor may be used.

The front wheels 6 are provided as drive wheels and are also provided as steered wheels. Therefore, the front wheels 6 are provided to be steerable by a handle 30 used by the driver when operating the vehicle. The handle 30 is connected to an electric power steering (EPS) device 35, and provided so that the front wheels 6 can be steered via the EPS device 35. A steering angle sensor 36, which is steering angle detection means for detecting a steering angle, which is a rotation angle of the handle 30, is provided in the EPS device 35 that is provided in the above-described manner. The steering of the front wheels 6 can be performed by a variable gear ratio steering (VGRS) 38 that can change a gear ratio of steering according to the vehicle speed and steering angle.

A hydraulically operated wheel cylinder 51 and a brake disk 52 that is provided in combination with the wheel cylinder 51 and rotates integrally with the wheel 5 when the wheel 5 rotates are provided in the vicinity of each wheel 5. Further, the vehicle 1 is provided with a brake hydraulic control device 50 that is connected by a hydraulic path 53 to the wheel cylinder 51 and controls the hydraulic pressure acting upon the wheel cylinder 51 during a brake operation. The brake hydraulic control device 50 is provided to enable independent hydraulic control of each wheel cylinder 51 provided in the vicinity of each wheel 5. As a result, the brake hydraulic control device 50 is provided to enable independent control of the brake forces of a plurality of wheels 5.

These engine 12, automatic transmission 15, EPS device 35, VGRS 38, and also brake hydraulic control device 50 and wheel cylinders 51 are provided as actuators that enable the vehicle 1 to travel. Among these actuators, the engine 12, automatic transmission 15 and also brake hydraulic control device 50 and wheel cylinders 51 can perform acceleration or brake control. Therefore, these components are provided as actuators that perform travel control of the vehicle 1 in the longitudinal direction. The EPS device 35 and VGRS 38 can change the advance direction of the vehicle 1 by changing the orientation of the front wheels 6. Therefore, these components are provided as actuators that perform travel control in the lateral direction of the vehicle 1, that is, transverse direction of the vehicle 1.

A camera 60, which is image pick-up means for picking up an image of a state in front of the vehicle 1, and a radar 61, which is vehicle-to-vehicle distance detection means for detecting the distance to another vehicle that travels in front of the host vehicle, are provided at the front end of the vehicle 1. Among these devices, the camera 60 uses a charge coupled device (CCD) and performs electric processing of the picked-up image. The vehicle 1 is also provided with a car navigation system 65. The car navigation system 65 is a device that makes it possible for the driver to recognize the present position of the host vehicle and surrounding road conditions by using a GPS (not shown in the figure) and map information stored in a storage unit (not shown in the figure) provided in the car navigation system 65.

These camera 60, radar 61, and car navigation system 65 are all provided as travel condition detection means for detecting conditions around the vehicle 1. Among these travel condition detection means, the camera 60 is provided as transverse condition detection means for measuring a position of the vehicle 1 in the transverse direction, and the radar 61 is provided as longitudinal condition detection means for measuring a position of the vehicle 1 in the longitudinal direction.

Figure 2A:
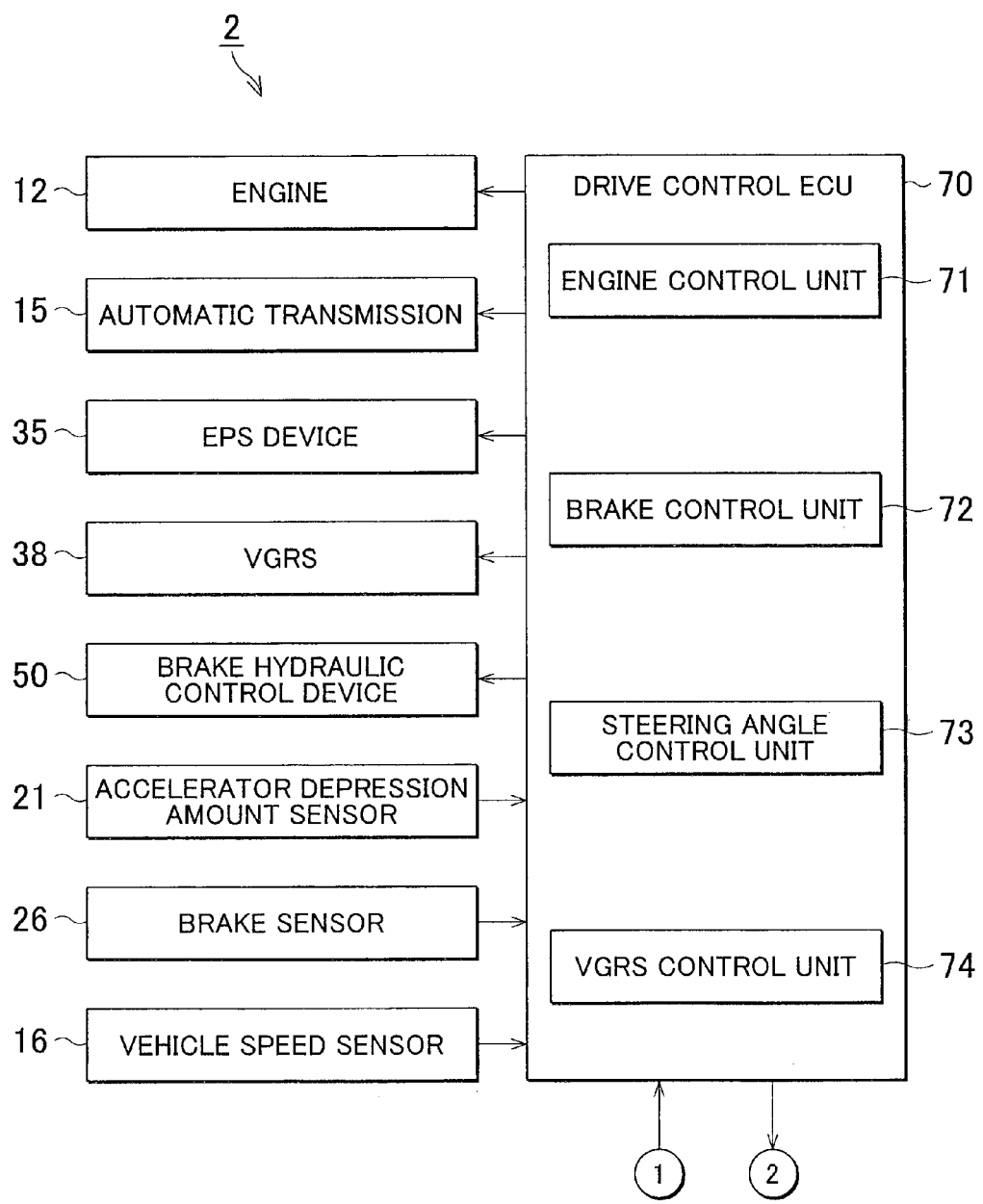
FIG. 2A and FIG. 2B are principal schematic diagrams of the vehicle control device shown in FIG. 1.
Figure 2B:
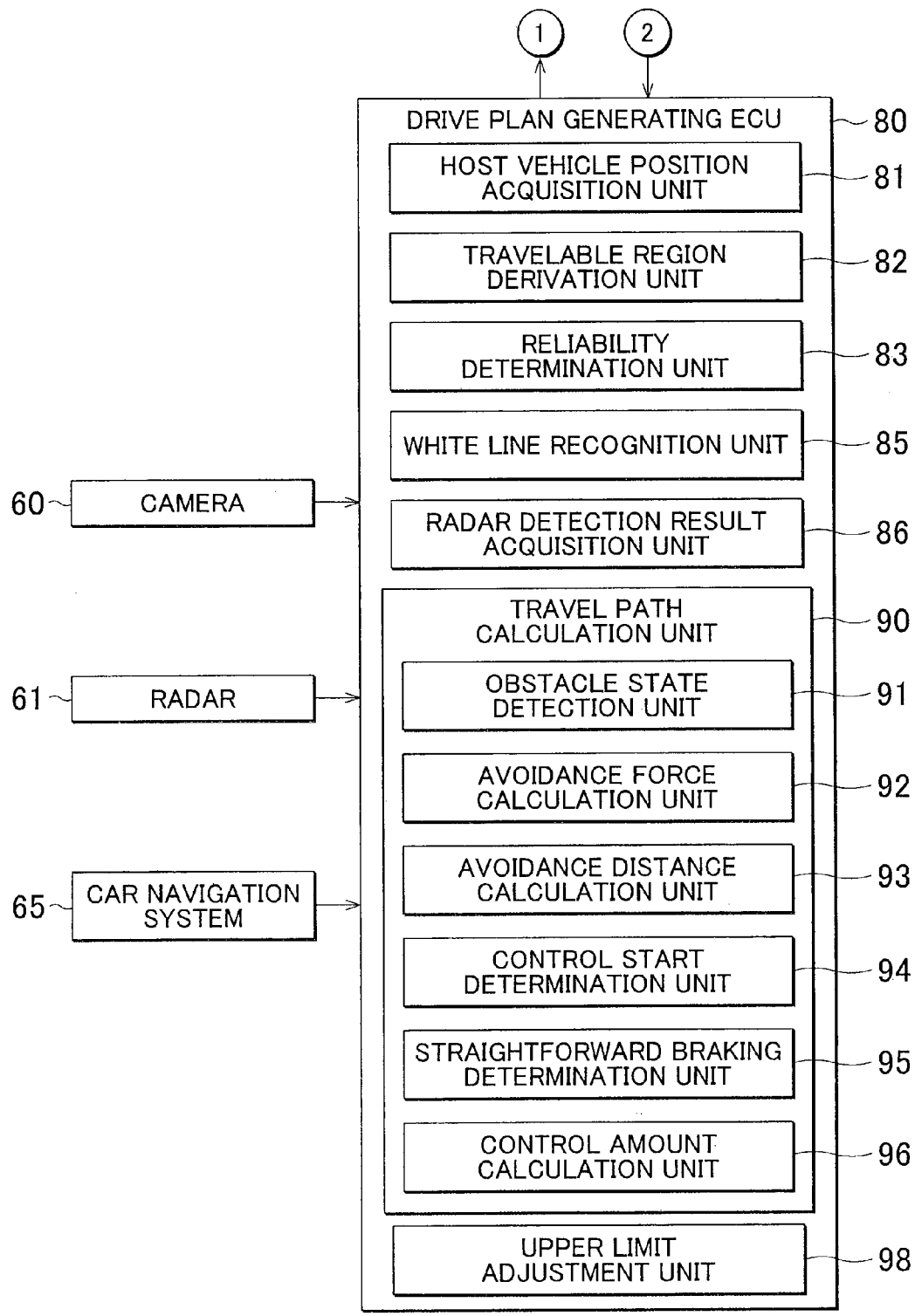

FIG. 2A and FIG. 2B are principal structural diagrams of the vehicle control device shown in FIG. 1. Among the aforementioned devices carried on the vehicle 1, the engine 12 and the automatic transmission 15 constituting the drive device 10 and also the EPS device 35, VGRS 38, and brake hydraulic control device 50 are connected to a drive control electronic control unit (ECU) 70 that is carried by the vehicle 1 and performs drive control of the vehicle 1 and are controlled and actuated by the drive control ECU 70. Further, the accelerator depression amount sensor 21, brake sensor 26, and vehicle speed sensor 16 are also connected to the drive control ECU 70, and these accelerator depression amount sensor 21, brake sensor 26, and vehicle speed sensor 16 detect the depression amounts of the accelerator pedal 20 and the brake pedal 25 and the vehicle speed and transmit the detection results to the drive control ECU 70.

The camera 60, radar 61, and car navigation system 65 are connected to a drive plan generating ECU 80 that generates a drive plan, for the travel of the vehicle 1, and information acquired by the aforementioned devices is transmitted to the drive plan generating ECU 80. These drive control ECU 70 and drive plan generating ECU 80 are connected to each other and can exchange information or signals. The hardware configurations of the drive control ECU 70 and the drive plan generating ECU 80 are conventional configurations provided with a processing unit having a central processing unit (CPU) or the like and a storage unit such as a random access memory (RAM), and the description thereof is herein omitted.

Among these ECU, the drive control ECU 70 has an engine control unit 71 that performs drive control of the engine 12, a brake control unit 72 that controls a brake force by controlling the brake hydraulic control device 50, a steering angle control unit 73 that controls the EPS device 35, and a VGRS control unit 74 that controls the VGRS 38 by adjusting the ratio of steering of the front wheels 6 to the steering angle according to the vehicle speed and steering angle.

The drive plan generating ECU 80 has a host vehicle position acquisition unit 81 that acquires a position through which the vehicle 1 travels, that is, a position of the host vehicle, by using the car navigation system 65, a travelable region derivation unit 82 that derives a travelable region, which is a region around the host vehicle in which the host vehicle can travel, a reliability determination unit 83 that determines reliability of information used when the travelable region is derived, a white line recognition unit 85 that recognizes a white line on the road where the vehicle 1 is traveling on the basis of an image picked up by the camera 60, a radar detection result acquisition unit 86 that acquires detection results obtained with the radar 61, a travel path calculation unit 90 that calculates a planned travel path of the vehicle 1, and an upper limit adjustment unit 98 that adjusts an upper limit value of a tire generated force according to the derived travelable region.

Further, among the aforementioned units, the travel path calculation unit 90 has an obstacle state detection unit 91 that detects a correlation between the vehicle 1 and an obstacle, an avoidance force calculation unit 92 that calculates a force necessary to avoid the obstacle at the shortest distance, an avoidance distance calculation unit 93 that calculates the shortest avoidance distance which is the shortest distance between the host vehicle and the obstacle that is necessary to avoid the obstacle, a control start determination unit 94 that determines whether or not to start the control to avoid the obstacle, a straightforward braking determination unit 95 that determines whether or not to perform straightforward braking when avoiding the obstacle, and a control amount calculation unit 96 that calculates a control amount when avoiding the obstacle.

The vehicle control device 2 according to the present embodiment has the above-described configuration, and the operation thereof will be described below. In the usual travel mode of the vehicle 1, the driver operates the handle 30, accelerator pedal 20, and brake pedal 25, thereby operating the actuators such as the engine 12, the brake hydraulic control device 50, and the EPS device 35, and the vehicle 1 travels according to the driving operations performed by the driver.

The vehicle control device 2 of the present embodiments assists the driver, as necessary, on the basis of driver's intentions, for example; when the driver switches a changeover switch (not shown in the figure), and can read surrounding conditions of a road where the vehicle 1 is traveling or the like, and perform travel control of the vehicle 1. Thus, the vehicle control device is provided to enable the drive support control, and when the drive support control is performed, the vehicle control device acquires information on surrounding conditions of the road where the vehicle 1 is traveling, for example with the camera 60 or the radar 61, and performs travel control of the vehicle 1 on the basis of the acquired information.

Where information on surrounding conditions of the road where the vehicle 1 is traveling is acquired when such a travel control is performed, the information is acquired on the basis of detection results obtained with a plurality of travel condition detection means such as the camera 60 and the radar 61, but reliability of these detection means can vary depending on the state at the time the information is detected. For this reason, in the vehicle control device 2 of the present embodiment, information on surrounding conditions of the road where the vehicle 1 is traveling is detected by a plurality of travel condition, detection means, conditions around the vehicle 1 are estimated on the basis of the detected information and reliability of each detection means at the time of detection, and travel control of the vehicle 1 is performed according to the estimation results.

Figure 3:
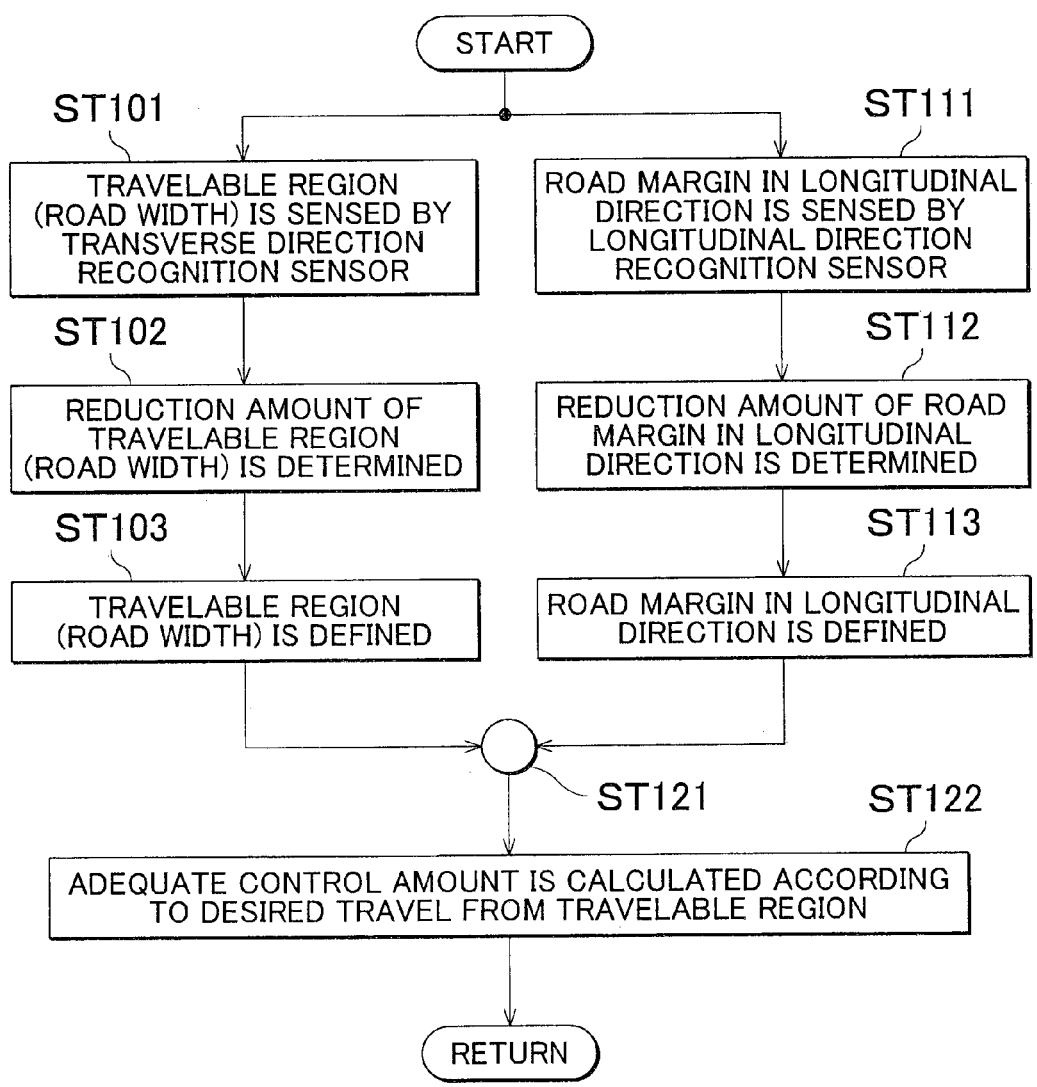
FIG. 3 is a schematic diagram relating to the case in which travel control of a vehicle is performed on the basis of environment in which the vehicle travels in an embodiment of the invention.

FIG. 3 is a schematic diagram illustrating a state in which travel control of the vehicle is performed on the basis of environment surrounding the traveling vehicle. The case in which drive support travel control is performed by acquiring information on surrounding conditions of the road where the vehicle 1 is traveling will be summarily explained below. Where such control is performed, surrounding conditions are detected with a plurality of travel condition detection means when the surrounding conditions are detected and reliability of each travel condition detection means is determined to perform travel control of the vehicle. For example, travel control of the vehicle 1 is performed on the basis of detection results obtained with a transverse direction recognition sensor 105, which is transverse condition detection means for detecting information in the transverse direction of the road where the vehicle 1 is traveling, such as the camera 60, and detection results obtained with a longitudinal direction recognition sensor 106, which is longitudinal direction conditions detection means for detecting information in the longitudinal direction of the vehicle 1, such as the radar 61. The travel control of the vehicle 1 performed on the basis of such detection results obtained with the transverse direction recognition sensor 105 and detection results obtained with the longitudinal direction recognition sensor 106 will be successively explained below. The transverse direction recognition sensor 105 senses the travelable region of the road where the vehicle 1 is traveling. Thus, the transverse direction recognition sensor 105 such as the camera 60 senses a width of the road or a width of the lane (step ST101).

Figure 4:
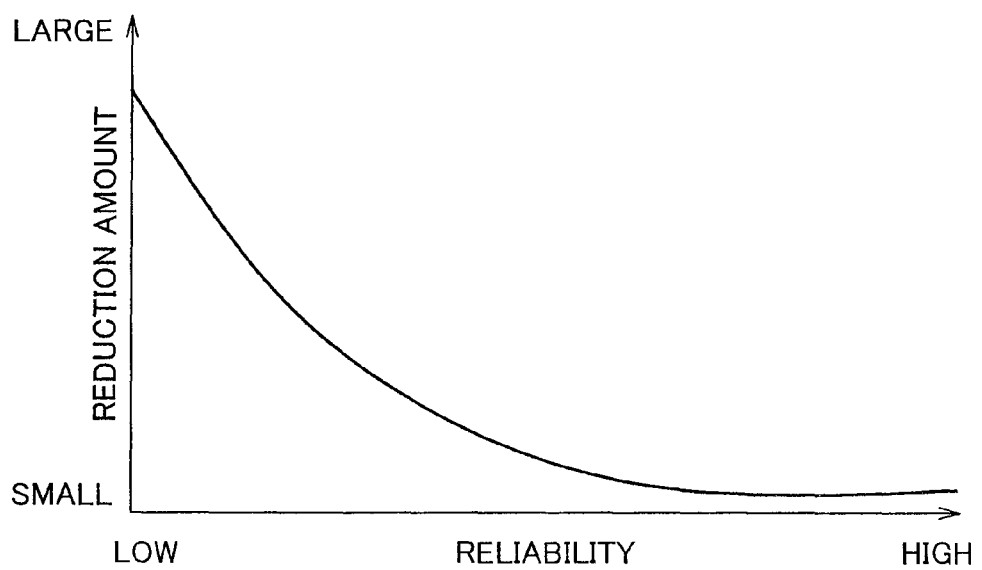
FIG. 4 is an explanatory diagram illustrating the relationship between a reduction amount of the travelable region and reliability of the detected information in the embodiment of the invention.

Once the travelable region has thus been detected by the transverse direction recognition sensor 105, a reduction amount of the detected travelable region is determined according to reliability of information detected by the transverse direction recognition sensor 105, on the basis of the present detection state of the transverse direction recognition sensor 105 (step ST102). FIG. 4 is an explanatory diagram illustrating the relationship between a reduction amount of the travelable region and reliability of the detected information. When a reduction amount of the travelable region is determined according to reliability of information detected by the transverse direction recognition sensor 105, the travelable region detected by the transverse direction recognition sensor 105 is reduced as reliability of information detected by the transverse direction recognition sensor 105 decreases, on the basis of the detection state in the transverse direction recognition sensor 105. Conversely, when reliability of information detected by the transverse direction recognition sensor 105 is high, a reduction amount of the travelable region detected by the transverse direction recognition sensor 105 is decreased as reliability of the information increases, on the basis of the detection state in the transverse direction recognition sensor 105, and the travelable region is maintained.

A road width that is a travelable region of the road used to perform travel control of the vehicle 1 is defined on the basis of reliability of information detected by the transverse direction recognition sensor 105 when the travelable region is thus detected by the transverse direction recognition sensor 105 (step ST103).

Further, the longitudinal direction recognition sensor 106 similarly senses a road margin in the longitudinal direction of the vehicle 1 (step ST111). Once the road margin in the longitudinal direction of the vehicle 1 is thus detected by the longitudinal direction recognition sensor 106, a reduction amount of the detected road margin in the longitudinal direction is determined according to reliability of detection in the longitudinal direction recognition sensor 106 on the basis of the present detection state of the longitudinal direction recognition sensor 106 (state ST112, see FIG. 4). Thus, a road margin in the longitudinal direction detected by the longitudinal direction recognition sensor 106 is reduced as reliability of information detected by the longitudinal direction recognition sensor 106 decreases, and a reduction amount of the road margin in the longitudinal direction detected by the longitudinal direction recognition sensor 106 is reduced as reliability of information detected by the longitudinal direction recognition sensor 106 increases, on the basis of the detection state of the longitudinal direction recognition sensor 106, and the road margin in the longitudinal direction is maintained.

The longitudinal margin of the road used when performing travel control of the vehicle 1 is thus defined on the basis of reliability of information detected by the longitudinal direction recognition sensor 106 at the time, the longitudinal margin is detected by the longitudinal direction recognition sensor 106 (step ST113).

The steps performed to define the travelable region (steps ST101 to ST103) and the steps performed to define the road margin in the longitudinal direction (steps ST111 to ST113) may be implemented in parallel or sequentially.

Once the travelable region and road margin in the longitudinal direction are thus defined, they are combined (step ST121). As a result, it is possible to define a travelable region that is a region of high reliability travelable in the widthwise direction and longitudinal direction of the road where the vehicle 1 is traveling. When travel control of the vehicle 1 is performed, an adequate control amount is calculated in accordance with the desired travel from the travelable region that has thus been defined (step ST122).

Figure 5A:
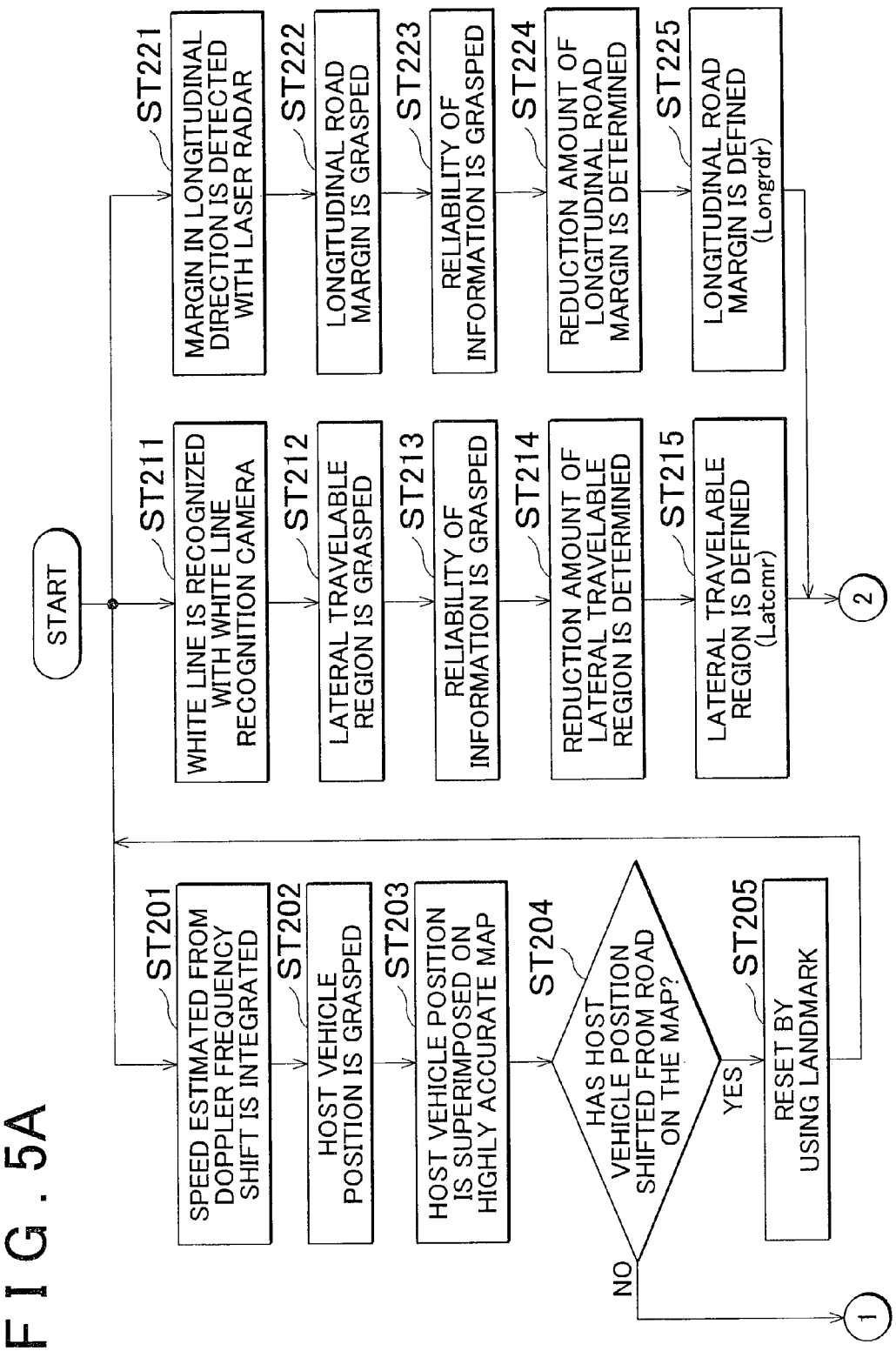
FIG. 5A and FIG. 5B are flowcharts relating to the case in which vehicle travel control is performed on the basis of environment in which the vehicle travels in the embodiment of the invention.
Figure 5B:
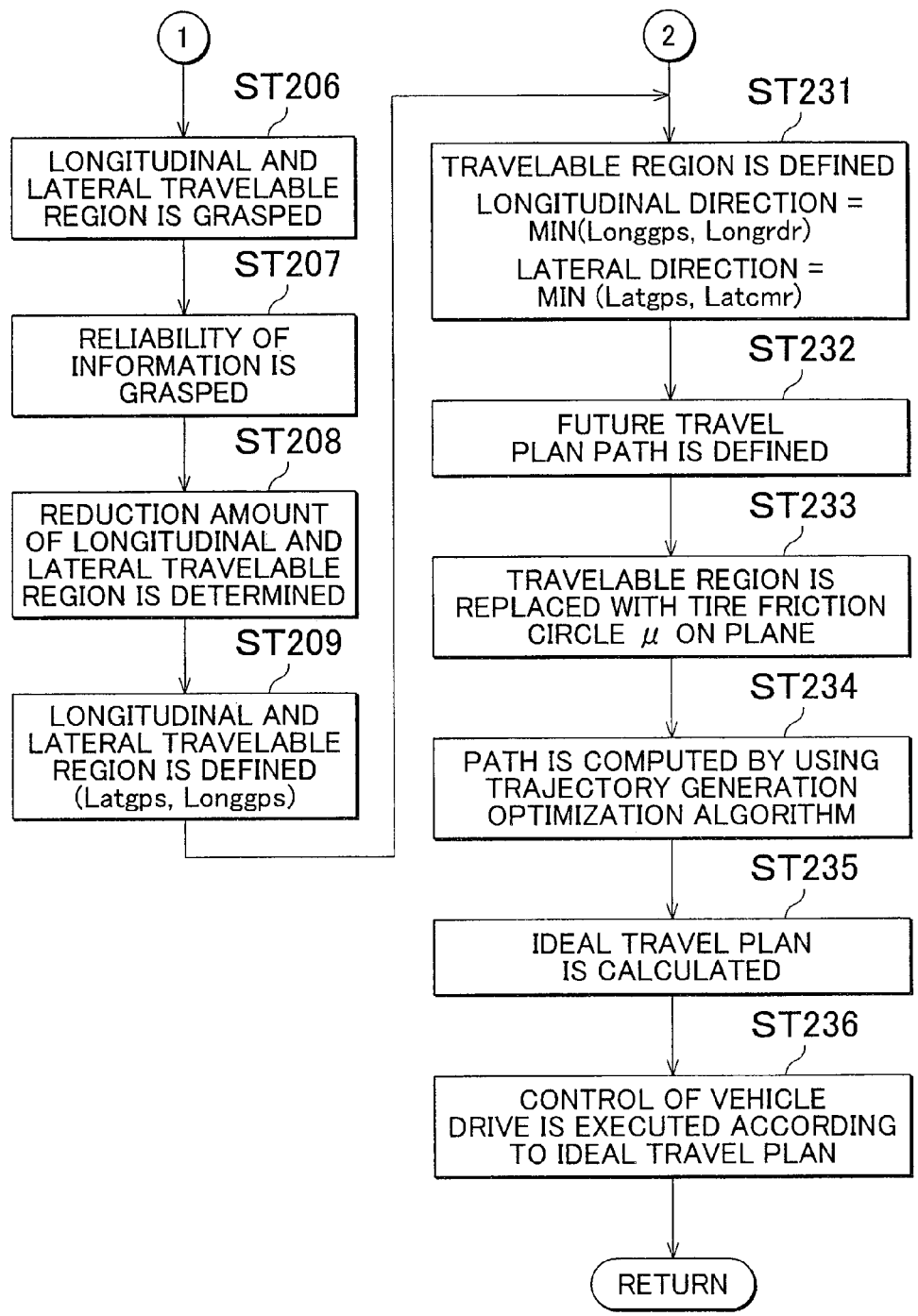

When drive support travel control is performed by acquiring information on surrounding conditions of the road where the vehicle 1 is traveling, the operations are performed in the above-described manner. This control will be described below in greater detail. FIG. 5A and FIG. 5B are flowcharts relating to a case in which travel control of a vehicle is conducted on the basis of environment in which the vehicle travels. When a travelable region is calculated as the vehicle 1 travels, the width of the road where the vehicle 1 is traveling and the margin in the longitudinal direction of the traveling vehicle 1 are defined as described hereinabove, but the conditions under which the host vehicle, which is the vehicle 1, travels should be recognized in order to increase the accuracy of the road width and margin in the longitudinal direction of the vehicle. For this purpose, it is necessary to recognize a position of the traveling host vehicle and grasp this position in order to define a width of the road where the host vehicle is traveling and the margin in the longitudinal direction of the traveling host vehicle.

Thus, in order to grasp the position of the traveling host vehicle, speed integration is used of a speed that is estimated on the basis of a Doppler frequency shift determined by the GPS used in the car navigation system 65 (step ST201). Where the GPS is used to grasp the position of the traveling host vehicle, when electromagnetic, waves emitted from a satellite used by the GPS are received by the car navigation system 65, the speed estimated from the Doppler frequency shift caused by relative movement of the satellite and the host vehicle is integrated. This integration is performed in the host vehicle position acquisition unit 81 provided in the drive plan generating ECU 80.

In the vehicle position acquisition unit 81, the position of the traveling host vehicle is grasped by so integrating the speed estimated from the Doppler frequency shift (step ST202). In other words, when the host vehicle travels, a relative position of the host vehicle and the satellite emitting electromagnetic waves changes, and when the electromagnetic waves are received by the car navigation system 65, while the relative position thus changes, the frequency at the time of reception is different from that at the time of transmission and the so-called Doppler frequency is generated. Further, the Doppler frequency shifts according to the relative movement state of the satellite and host vehicle. Therefore, by integrating the speed estimated from the Doppler frequency shift, it is possible to recognize not only the positional relationship of the traveling host vehicle and the satellite emitting the electromagnetic waves, but also the relative movement relationship thereof, and the position of the host vehicle can be grasped with higher accuracy. In the vehicle control device 2 of the present embodiment, the integration of speed estimation results using the Doppler frequency is explained as representative means to be used for grasping the position of the traveling host vehicle, but other means for grasping the position of the traveling host vehicle may be also used. The means for grasping the position of the traveling host vehicle may be any means for estimating a trajectory, and essentially any means may be used, provided that the position of the traveling host vehicle can be adequately grasped by estimating a trajectory.

Once the host vehicle position has been grasped, the host vehicle position is superimposed on a highly accurate map (step ST203). As a result, it is possible to determine the present location, travel speed, and travel direction of the host vehicle. Then, it is determined whether the position of the host vehicle superimposed on the highly accurate map has shifted from the road on the map (step ST204).

When the host vehicle, position is determined to have shifted from the road on the map, reset with landmarks is performed (step ST205). Thus, the grasped host vehicle position is reset when the difference between a distance between the host vehicle position grasped by integrating the speed estimated from the Doppler frequency shift and the landmark in the vicinity of the host vehicle on the map and the distance between the landmark on the map and the road close to the landmark is greater than a predetermined difference. As a result, the actual position of the host vehicle is reflected more correctly as a position of the host vehicle on the highly accurate map, and the host vehicle position acquisition unit 81 acquires the correct position of the host vehicle.

Where the position of the host vehicle superimposed on the highly accurate map is determined not to have shifted from the road on the map, the longitudinal and lateral travelable regions are then grasped (step ST206). In other words, travelable regions in the longitudinal direction and lateral direction of the host vehicle in the road where the host vehicle is presently traveling are derived by the travelable region derivation unit 82 of the drive plan generating ECU 80 from the position of the host vehicle on the map and the state of the road around the host vehicle, and the travelable regions that are thus derived from the position of the host vehicle computed by using the GPS are grasped as longitudinal and lateral travelable regions by the travelable region derivation unit 82.

Further, when the longitudinal and lateral travelable regions are thus derived by integrating the speed estimated from the Doppler frequency shift, reliability of information in the process of computing the host vehicle position by using the GPS is also grasped (step ST207). The information reliability is grasped by determining reliability with the reliability determination unit 83 of the drive plan generating ECU 80. Thus, reliability in the process of deriving the longitudinal and lateral travelable regions by integrating the speed estimated from the Doppler frequency shift is determined by the reliability determination unit 83 according to the state of the GPS.

A reduction amount of the present longitudinal and lateral travelable regions of the vehicle 1 grasped by the travelable region derivation unit 82 is then determined (step ST208, see FIG. 4). In other words, the reduction amount of the longitudinal and lateral travelable regions grasped by using the car navigation system 65 is increased as reliability of information in the process of deriving the longitudinal and lateral travelable regions decreases, on the basis of the present longitudinal and lateral travelable regions grasped by the travelable region derivation unit 82 and reliability of information in the process of deriving the longitudinal and lateral travelable regions grasped by the reliability determination unit 83. Conversely, the reduction amount of the longitudinal and lateral travelable regions is decreased as reliability of information in the process of deriving the longitudinal and lateral travelable regions increases.

The longitudinal and lateral travelable regions (Latgps, Longgps) used when performing travel control of the vehicle 1 are defined on the basis of reliability of information in the process of deriving the longitudinal and lateral travelable regions determined according to the state of GPS (step ST209).

The travelable region in the present position of the traveling host vehicle on the map can thus be defined by grasping the host vehicle position and superimposing it on the highly accurate map, but during travel control of the vehicle 1, the travelable regions are derived also on the basis of actual surrounding conditions such as margins in the longitudinal direction and lateral direction of the vehicle 1. When the travelable region is thus derived on the basis of margins in the longitudinal direction and lateral direction of the vehicle 1, the surrounding conditions are detected by using detection means capable of directly detecting the conditions around the vehicle 1 and the travelable region is derived.

As the detection means for detecting a state in the lateral direction of the vehicle 1 among the aforementioned means, the camera 60, which is an example of a transverse direction recognition sensor 105, is used as a white line recognition camera and a white line on the road is recognized by using the camera 60 (step ST211). In other words, the surroundings in front of the vehicle 1 on the road where the vehicle 1 is traveling are picked up with the camera 60 and the white line painted on the road is recognized. This recognition is performed with the white line recognition unit 85 provided in the drive plan generating ECU 80. Thus, the white line recognition unit 85 acquires an image picked up by the camera 60 and recognizes the white line in the image, thereby recognizing the white line on the road.

The lateral travelable region is then grasped by the travelable region derivation unit 82 on the basis of the white line recognized by the white line recognition unit 85 (ST212). In the travelable region derivation unit 82, the width of the road where the vehicle 1 is presently traveling is grasped on the basis of the position of the white line recognized by the white line recognition unit 85. Thus, the travelable region derivation unit 82 calculates a distance between the white line position in the lateral direction in the traveling direction of the vehicle 1, or a distance between the white line and a road shoulder as a width of the lane where the vehicle 1 is traveling, on the basis of the white line recognized by the white line recognition unit 85, and derives and grasps the width of the lane as the lateral travelable region.

Further, when the lateral travelable region is thus grasped on the basis of the white line recognized by the white line recognition unit 85, reliability of information obtained when the lateral travelable region is grasped on the basis of the image picked up by the camera 60 is also grasped by the reliability determination unit 83 (step ST213). The reliability determination unit 83 determines and grasps reliability of information obtained when the lateral travelable region, which is the travelable region in the lateral direction in the advance direction of the vehicle 1 or in the widthwise direction of the road where the vehicle is traveling, according to the image picked up by the camera 60.

Then, a reduction amount of the present lateral travelable region of the vehicle 1 grasped on the basis of the lane width in the travelable region derivation unit 82 is determined (step ST214, see FIG. 4). In other words, from the present lateral travelable region grasped by the travelable region derivation unit 82 on the basis of the lane width and reliability of information obtained when deriving the lateral travelable region determined in the reliability determination unit 83 on the basis of the image picked up by the camera 60, the travelable region derivation unit 82 increases the reduction amount of the lateral travelable region according to the decrease in the reliability. Conversely, the travelable region derivation unit 82 decreases the reduction amount of the lateral travelable region according to the increase in the reliability.

The travelable region derivation unit 82 defines the lateral travelable region (Latcmr) that has been thus derived on the basis of the image picked up by the camera 60 used as a white line recognition camera, on the basis of reliability of information of the lateral travelable region determined according to the image picked up by the camera 60 (step ST215).

Further, a configuration in which the radar 61 serving as a laser radar, capable or recognizing a state around the vehicle 1 with a laser is used as an example of a longitudinal direction recognition sensor 106 is used as detection means for detecting a longitudinal margin of the vehicle 1 (step ST221). In other words, an obstacle present in the longitudinal direction of the host vehicle is detected by causing the radar 61 to emit a laser beam in a predetermined direction and receiving a reflected laser beam that is obtained by reflection of the emitted laser beam from the obstacle such as another vehicle. The detection result is transmitted to the radar detection result acquisition unit 86 of the drive plan generating ECU 80 and acquired by the radar detection result acquisition unit 86. By acquiring the detection result obtained with the radar 61, the radar detection result acquisition unit 86 recognizes conditions around the host vehicle, for example, recognizes the presence of another vehicle traveling in front of the host vehicle.

A longitudinal road margin is grasped in the travelable region derivation unit 82 on the basis of the conditions around the host vehicle recognized by acquiring the detection result obtained with the radar 61 with the radar detection result recognition unit 86 (step ST222). In the travelable region derivation unit 82, a present margin in the longitudinal direction of the host vehicle is derived and grasped on the basis of the conditions around the host vehicle recognized by the radar detection result acquisition unit 86. Thus, the travelable region derivation unit 82 calculates the distance between the host vehicle and another vehicle or the like on the basis of the conditions around the host vehicle recognized by the radar detection result acquisition unit 86, mainly the conditions in front of the vehicle 1 in the advance direction thereof, and derives and grasps the calculated distance as a road margin in the longitudinal direction.

When the longitudinal road margin is thus grasped on the basis of the detection result obtained with the radar 61 and acquired by the radar detection result acquisition unit 86, reliability of information obtained when the longitudinal road margin is grasped on the basis of the detection result obtained with the radar 61 is also determined and grasped by the reliability determination unit 83 (step ST223). The reliability determination unit 83 determines and grasps reliability of information obtained when deriving the road margin in the longitudinal direction of the vehicle 1 according to the detection result obtained with the radar 61.

A reduction amount of the road margin in the longitudinal direction of the vehicle 1 grasped by the travelable region derivation unit 82 on the basis of the detection result obtained with the radar 61 is then determined (step ST224, see FIG. 4). In other words, from the present longitudinal road margin grasped by the travelable region derivation unit 82 on the basis of the detection result obtained with the radar 61 and reliability of information obtained when deriving the longitudinal road margin determined in the reliability determination unit 83 on the basis of the detection result obtained with the radar 61, the travelable region derivation unit 82 increases the reduction amount of the longitudinal road margin according to the decrease in the reliability. Conversely, the travelable region derivation unit 82 decreases the reduction amount of the longitudinal road margin ion according to the increase in the reliability.

The travelable region derivation unit 82 defines the longitudinal road margin (Longrdr) that has thus been derived on the basis of the detection result obtained with the radar 61, on the basis of reliability of information relating to the longitudinal road margin determined according to the detection result obtained with the radar 61 (step ST225).

The processing of these steps (steps ST201 to ST209) performed to define the longitudinal travelable region, steps (steps ST211 to ST215) performed to define the lateral travelable region, and steps (steps ST221 to ST225) performed to define the longitudinal road margin may be carried out in parallel or the steps may be performed sequentially.

The travelable region derivation unit 82 that has so derived the longitudinal and lateral travelable regions (Latgps, Longgps), lateral travelable region (Latcmr), and longitudinal road margin (Longrdr) by using the car navigation system 65, camera 60, and radar 61 then defines the travelable region by using the derivation results (step ST231). The travelable region derivation unit 82 that has derived these travelable regions defines travelable regions with small values, from among the travelable regions in the longitudinal direction and lateral direction obtained when the vehicle 1 travels, as travelable regions in respective directions.

More specifically, the travelable region derivation unit 82 compares the longitudinal travelable region (Longgps) derived by using the car navigation system 65 with the longitudinal road margin (Longrdr) derived on the basis of the detection result obtained with the radar 61 and defines the smaller of the two as a travelable region in the longitudinal direction. Likewise, the travelable region derivation unit 82 compares the lateral travelable region (Latgps) derived by using the car navigation system 65 with the lateral travelable region (Latcmt) derived on the basis of the image picked up by the camera 60 and defines the smaller of the two as a travelable region in the lateral direction. In other words, the travelable region derivation unit 82 defines the travelable region in the longitudinal direction by deriving with {Longitudinal Direction=MIN (Longgps, Longrdr)} and defines the travelable region in the lateral direction by deriving with {Lateral Direction=MIN (Latgps, Latcmr)}.

A future travel plan path is then defined (step ST232). The future travel plane path is defined by deriving a travel plan path of the vehicle 1 for the interval from the present time till a predetermined time will elapse by the travel path calculation unit 90 provided in the drive plan generating ECU 80 on the basis of drive operations of the driver or the path to the target zone of the vehicle 1 inputted to the car navigation system 65.

The travelable region is then replaced on a plane with "μ" of a tire friction circle (step ST233). This replacement is performed by an upper limit adjustment unit 98 of the drive plan generating ECU 80. The upper limit adjustment unit 98 replaces the travelable region derived and defined by the travelable region derivation unit 82 with "μ" of a tire friction circle, which is a circle indicating a resultant force of friction forces of wheels 5 in the longitudinal and lateral directions, thereby reflecting the state of the travelable region in a tire generated force indicated by using the tire friction circle. The size of the tire generated force serving as a reference when establishing an upper limit for control when performing the travel control of the vehicle 1 is thereby adjusted according to the defined travelable region. For example, when there is a margin in the travelable region in the longitudinal direction, but no' significant margin is present in the travelable region in the lateral direction, "μ" of the tire friction circle in the transverse direction is reduced and the tire friction circle indicating the tire generated force is adjusted so that a ratio of force generated in the transverse direction of the vehicle 1 decreases when the travel control of the vehicle 1 is performed.

A travel path is then calculated according to trajectory generation optimization algorithm (step ST234). This calculation is performed by the travel path calculation unit 90. The travel path calculation unit 90 calculates the travel path by fitting the tire generated force that has been set by the upper limit adjustment unit 98 in the trajectory generation optimization algorithm that has been set in advance as a method for calculating the travel trajectory and stored in the storage unit of the drive plane generating ECU 80 when travel control of the vehicle 1 is performed.

An ideal travel plan is then calculated (step ST235). The ideal travel plane is calculated by the travel path calculation unit 90 as an ideal travel plan when performing the travel control of the vehicle 1. The travel path calculation unit 90 performs calculations by fitting the travel path calculated by using the trajectory generation optimization algorithm in the future travel plan path defined by the travel path calculation unit 90 and matching the two. As a result, the travel path calculation unit 90 calculates the ideal travel plan by the tire generated force. Therefore, the ideal travel plan is calculated according to the travelable region in the longitudinal direction or lateral direction. In other words, the ideal travel plan is calculated according to reliability of information obtained when deriving the travelable region.

Figure 6A:
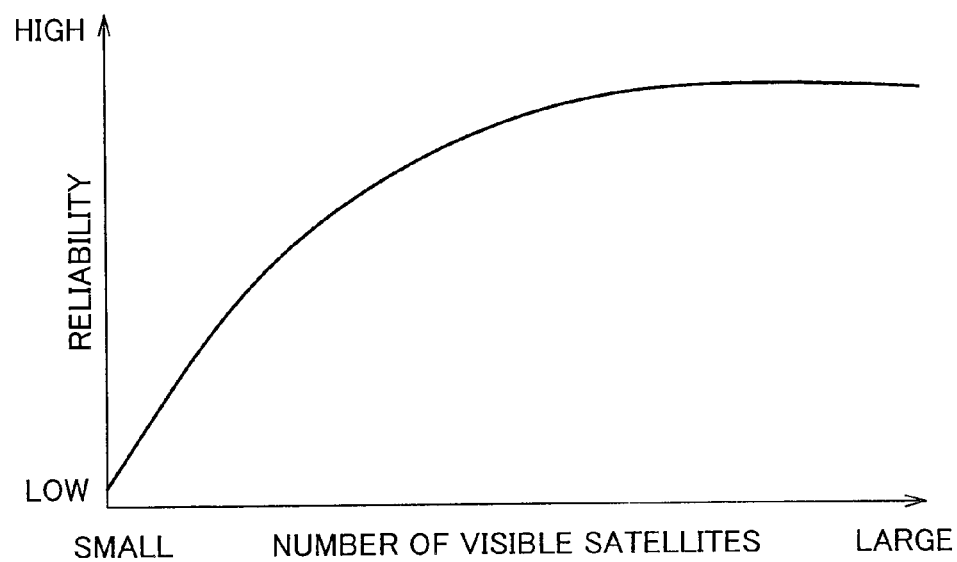
FIG. 6A is an explanatory drawing illustrating reliability when a travelable region is derived by using a global positioning system (GPS) in the embodiment of the invention.

Vehicle drive control is then executed according to the ideal travel plan (step ST236). The drive control is performed by the drive control ECU 70. The drive control ECU 70 executes travel control according to the ideal travel plan calculated by the travel path calculation unit 90 by controlling each actuator when the vehicle 1 is caused to travel by the engine 12 or the like with the control units such as the engine control unit 71 and the brake control unit 72 provided in the drive control ECU 70. As a result, the vehicle 1 travels according to the ideal travel plan.

Where a travelable region is derived when performing drive support control with the vehicle control device 2 in the present embodiment, the travelable region is reduced according to reliability of information obtained when detecting the conditions around the vehicle 1 by using the travel condition detection means used to derive the travelable region. A way to determine the reliability of information obtained when deriving the travelable region by using these travel condition detection means will be explained below. FIGS. 6A to 6D are explanatory drawings illustrating the reliability when the travelable region is derived by using a GPS. When an accuracy of GPS speed estimation by speed integration estimated from the Doppler frequency shift is determined and reliability of the derived information is determined when deriving the travelable region, the reliability is determined according to the state of the satellite used for GPS. For example, the determination is performed by changing the reliability by the number of visible satellites, as shown in FIG. 6A. In other words, satellites used in the GPS are positioned in the space over the entire surface of the earth so that a satellite can be viewed from any position on the earth, but the number of the visible satellites, which are satellites positioned in a range visible from the earth, differs depending on the point on the earth. Further, the accuracy attained when the speed of the vehicle 1 is estimated by using a GPS tends to increase with the increase in the number of visible satellites. For this reason, when the reliability is changed according to the number of visible satellites, the reliability is determined by increasing the reliability as the number of visible satellites increases and decreasing the reliability as the number of visible satellites decreases.

Figure 6B:
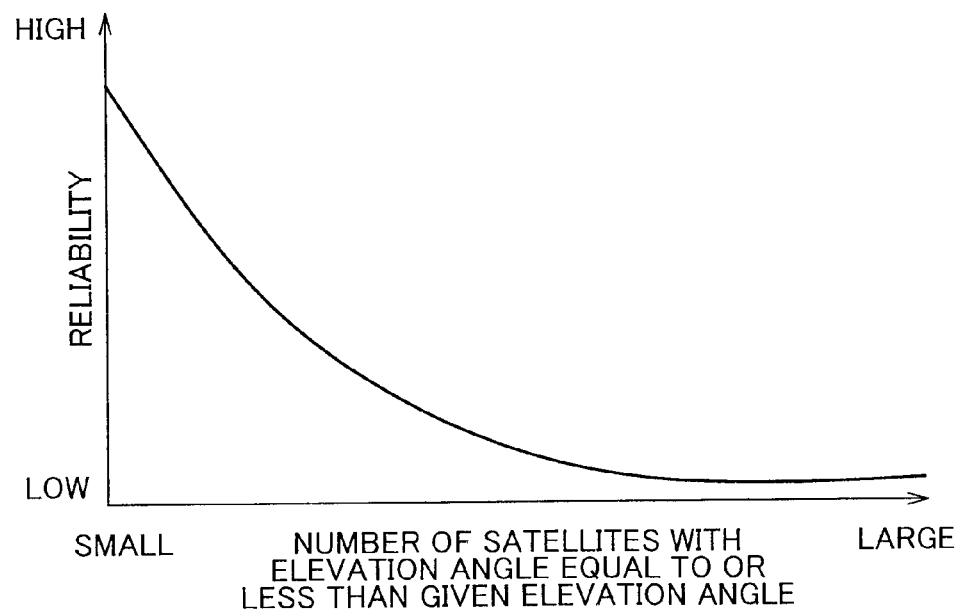
FIG. 6B is an explanatory drawing illustrating reliability when a travelable region is derived by using a GPS in the embodiment of the invention.
Figure 6C:
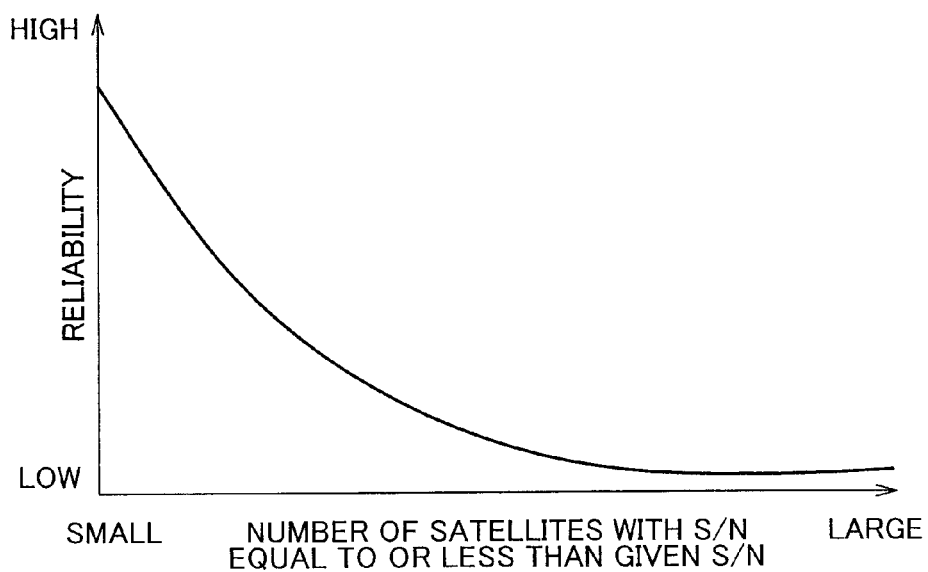
FIG. 6C is an explanatory drawing illustrating reliability when a travelable region is derived by using a GPS in the embodiment of the invention.

Further, reliability of information obtained when the travelable region is derived by using a GPS may be also determined by satellite information. In other words, with a satellite that is visible but has an angle of elevation equal to or less than a given value or a low signal to nose (S/N) ratio, electromagnetic waves transmitted from the satellite can be affected by reflection or diffraction, and the accuracy of speed estimation performed with such a satellite can decrease. Therefore, reliability is determined by decreasing the reliability with the increase in the number of satellites, among the visible satellites, that have an angle of elevation equal to or less than a given value and increasing the reliability with the decrease in the number of satellites that have an angle of elevation equal to or less than a given value, for example, as shown in FIG. 6B. Likewise, reliability is determined by decreasing the reliability with the increase in the number of satellites with a S/N ratio equal to or less than a given value and increasing the reliability with the decrease in the number of satellites with a S/N ratio equal to or less than a given value, for example, as shown in FIG. 6C.

Further, reliability of information obtained when the travelable region is derived by using a GPS may be also determined by a difference between an estimated speed and a relative speed. For example, when the number of visible satellites is equal to or greater than five, a difference between a speed estimation result and a speed relative to the satellites may be calculated and reliability may be determined according to the difference.

A method for calculating the difference is explained below. Since a line of sight of a satellite centered on the host vehicle can be computed from the position of the host vehicle, a host vehicle speed in the direction from the host vehicle to the satellite is calculated by converting the host vehicle speed calculated in an absolute system of coordinates centered on the host vehicle into a component in the line of sight. The calculated host vehicle speed is taken as Vvi.

Further, since the satellite speed can be determined on the basis of the Kepler laws, and the line of site of the host vehicle can be calculated as described hereinabove, the satellite speed in the direction from the host vehicle to the satellite is calculated by converting the satellite speed into a component in the line of sight. The calculated satellite speed is taken as Vsi.

A Doppler frequency shift amount is available as an observation value obtained from a GPS receiver (not shown in the figures) of the car navigation system 65 carried by the vehicle 1, and this Doppler frequency shift amount can be recalculated as a relative speed of the vehicle in the satellite direction. This speed is taken as Vv2si.

Further, when the host vehicle position is calculated using a GPS, the calculation is performed by using a timing used in the GPS as an important element, but where a clock bias drift, which is a variation of clock error used in the receiver, is estimated and the estimated clock bias drift is taken as Cvb, when no error is present in the above-described speeds (Vvi, Vsi, Vv2si), the relationship thereof can be represented as (Vv2si=Vsi−Vvi+Cvb). Where the right side in this equation is taken as an estimated value and denoted by Vv2si_est, when the sum total for all of the satellites (|Vv2si=Vv2si_est|) is small, the reliability of the estimated value can be assumed to be high. Conversely, where this sum total is large, the error as a whole is large and the reliability of the estimated value can be assumed to be low.

Figure 6D:
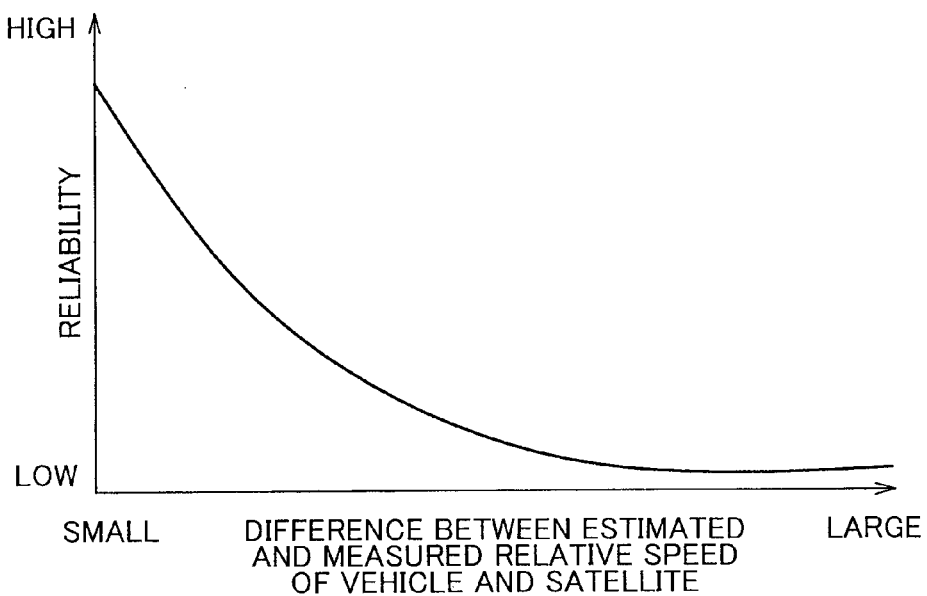
FIG. 6D is an explanatory drawing illustrating reliability when a travelable region is derived by using a GPS in the embodiment of the invention.

When the difference between a relative speed of the host vehicle and the satellite calculated from the estimated host vehicle speed and satellite speed and an observation value calculated from the Doppler frequency shift amount and indicating the relative speed of the host vehicle and the satellite is calculated and this difference is large, it is possible to determine that reliability of information obtained when a travelable region is derived by using a GPS is low. Therefore, when the number of visible satellites is equal to or greater than five, this difference is estimated, the reliability of information is determined as high according to the decrease in the calculated difference, and the reliability of information is determined as low according to the increase in the calculated difference, as shown in FIG. 6D.

In the case in which reliability of information is determined according to the state of the satellites used in the GPS when deriving a travelable region, each of the above-described determination methods may be used individually or a combination of the determination methods may be used. By conducting the determination with a combination of a plurality of the determination methods, it is possible to increase further the accuracy of reliability determination.

Explained below is a method for determining reliability of information obtained when a lateral travelable region is derived on the basis of the image picked up by the camera 60. In the case in which the lateral travelable region is derived on the basis of the image picked up by the camera 60, when reliability is determined by estimating a drive state of the vehicle 1 or estimating a posture of the vehicle 1 on the basis of the picked-up image, reliability is determined with respect to each of the estimation results. First, the determination of information reliability will be explained with respect to the case in which the drive state of the vehicle 1 is estimated.

The estimation of the drive state of the vehicle 1 performed on the basis of the image picked up by the camera 60 is explained below. When the drive state is estimated, first, a characteristic point in the picked-up image is extracted and the extracted characteristic point is tracked in a time sequence. For example, a point positioned on a contour of a white line on the road, a point in a specific portion of an installation such as a road mark, and a point in a specific portion of another means of communication can be extracted as a characteristic point. An angular variation and a translational movement amount of a plurality of tracked characteristic points are taken as estimation parameters serving as references when estimating a variation mode of the portion picked up by the camera 60, and a parameter with a high verification degree between time sequences, from among the estimation parameters, is taken as an estimation value.

The verification degree mentioned hereinabove will be explained below. For a stationary object positioned in the image pick-up direction of the camera 60, a positional relationship with the camera 60 changes as the host vehicle moves. Therefore, for a characteristic point on the stationary object, a projected position in the image is determined according to the movement of the host vehicle. Accordingly, when images picked up at a time t1 at which the image has been picked up and a time t2 at which the image has been picked up after a predetermined time has elapsed since t1 are compared and the stationary object is picked up in the images, all of the characteristic points on the stationary object are converted from the image at t1 to the image at t2 according to the same movement. As a result, the movement of the vehicle 1 can be estimated by tracking the characteristic points.

However, when variations of characteristic points in the images are tracked by comparing the images in the case the predetermined time has elapsed and the tracking results are erroneous, the estimation accuracy of movement is affected. Where erroneous estimation results are obtained when the movement of the vehicle 1 is estimated and the characteristic points of the image are thereafter tracked, some of the characteristic points can correspond to the estimation results, but some other characteristic points can differ from the estimation results. A high verification degree shows that the number of characteristic points following the movement estimation results when the characteristic points are tracked between time sequences is high.

Accordingly, in the case in which an angular variation and translational movement of characteristic points are taken as estimation values of a travel state of the vehicle 1 used to derive the lateral travelable region of the vehicle 1 in the process of determining the reliability of information based on the image picked up by the camera 60, when angular variation and translational movement of characteristic points in the case of tracking the characteristic points of the picked-up image are tracked as estimation parameters, a parameter with a large number of characteristic points following the movement estimation result is used as an estimation value.

Where a movable object is present in the image picked up by the camera 60, it is possible that the estimation accuracy in estimating the travel state of the vehicle 1 will decrease. When the characteristic points are tracked in such a case, the ratio of tracking results that do not conform to the estimated parameters increases. When the ratio of tracking results that do not conform to the estimated parameters in the case of tracking the singular points is high, the reliability of the estimation value is decreased and when a large number of tracking results match the estimated parameters, the reliability of the estimation value is increased. Thus, when characteristic points in the image picked up by the camera 60 are tracked, the reliability of the estimation value is increased with the increase in the ratio at which the variation of the tracked characteristic points matches the estimated variation of the characteristic points caused by the movement of the vehicle 1.

Next, the determination of information reliability in the case in which a posture of the vehicle 1 is estimated on the basis of the image picked up by the camera 60 will be explained. The estimation of the posture of the vehicle 1 performed on the basis of the image picked up by the camera 60 is explained below. When the posture of the vehicle 1 is estimated, a yaw angle or a pitch angle with respect to the white line of the road in the picked-up image is calculated. For example, a yaw angle or a pitch angle with respect to the white line is calculated by taking a contour of the white line in the picked-up image as an edge, calculating a direction of the edge by the Hough transformation or the like, and calculating the direction of the optical axis of the camera 60 with respect to the edge direction. In this case, the pitch angle is calculated from a degree of variation in the white line width calculated from the white line edge in the image or from a degree of variation in the distance between the white lines, and the yaw angle is calculated from a white line angle or a position of a vanishing point obtained by extending the edge direction.

The posture of the vehicle 1 can thus be estimated on the basis of the edge in the picked-up image, but when the posture of the vehicle 1 is estimated on the basis of the edge, the estimation accuracy increases when using a large number of edges of objects positioned in the proximity of the vehicle 1, but the estimation accuracy can decrease when using a large number of edges of distant objects. Therefore, where a voting number of proximal points is large in voting results of the Hough transformation when an edge direction is calculated by the Hough transformation, the reliability of calculated information is increased and when the voting number of distant points is large, the reliability of calculated information is decreased.

When the posture of the vehicle 1 is thus estimated by calculating the edge direction by the Hough transformation, reliability is decreased when the voting number is small. For example, where an erroneous edge other than that of the white line is used when an edge in the picked-up image is calculated, the voting number of the Hough transformation sometimes decreases. Therefore, when the voting number of the Hough transformation becomes equal to or less than a given value, the reliability of calculated information, that is, information relating to the estimated posture of the vehicle 1 is decreased.

In the case in which reliability of information is determined when deriving the lateral travelable region on the basis of the image picked up by the camera 60, a determination method relating to estimation of a drive state and a determination method relating to estimation of a posture of the vehicle 1 may be used individually or a combination of these determination methods may be used. By conducting the determination with a combination of the determination methods, it is possible to increase further the accuracy of reliability determination.

A method for determining reliability of information when deriving a longitudinal road margin on the basis of the detection result obtained with the radar 61 will be explained below. When the longitudinal road margin is derived on the basis of the detection result obtained with the radar 61 a drive state of the vehicle 1 is estimated or a posture of the vehicle 1 is estimated and reliability is determined for the respective procedure, similarly to the case in which a lateral travelable region is derived on the basis of the image picked up by the camera 60. First, determination of reliability in the case in which a drive state of the vehicle 1 is estimated on the basis of the detection result obtained with the radar 61 will be explained.

When a drive state of the vehicle 1 is estimated on the basis of the detection result obtained with the radar 61, an angular variation or a translational movement amount is used as an estimation parameter, similarly to the case in which a lateral travelable region is derived on the basis of the image picked up by the camera 60, but when the detection result is verified with the time sequence to estimate the drive state, it is possible that the verification degree during verification between time sequences be low. In other words, it is possible that the distance sum be large. Therefore, reliability at this time is evaluated according to a sum of differences in distance between the reflection points between time sequences.

The sum of differences in distance to the reflection points will be explained below. When the state outside the vehicle 1 is detected with the radar 61, where an emission point of the radar 61 from which a laser beam is emitted is considered as an origin point, reflection points of the detection object when the object is detected with the radar 61 will have a fan-like arrangement about the origin point as a center. A distance to each reflection point at a timing t1 during detection with the radar 61 will be denoted by $Ri(t1)$ and a distance to each reflection point at a timing t2 will be denoted by $Ri(t2)$. With such a definition, when the state of the vehicle 1 changes between the timing t1 and the timing t2, $Ri(t2)$ at the timing t2 can be represented as $R(Ri(t1)+T)$ where a variation amount of the host vehicle position is a translation T and a variation amount of direction is a rotation R.

When the drive state of the vehicle 1 is correctly estimated, $R(Ri(t1)+T)$ expected at the same direction or the same angle and the actually measured $Ri(t2)$ will assume equal values, but in the case of an error, a difference will appear therebetween. Thus, when the sum of differences in distance to the reflection points is determined, a difference is calculated between a distance to the reflection point predicted by estimating the drive state of the vehicle 1 and a measured distance to the reflection point, and this difference is calculated for several measurement points. The sum of differences for several measurement points is acquired as a sum of differences in distance to the reflection points.

When a drive state of the vehicle 1 is estimated on the basis of the detection result obtained with the radar 61, reliability of the estimation value is decreased as the sum of differences in distance to the reflection points calculated in the above-described manner increases and reliability of the estimation value is increased as the sum of differences in distance to the reflection points decreases.

Figure 7:
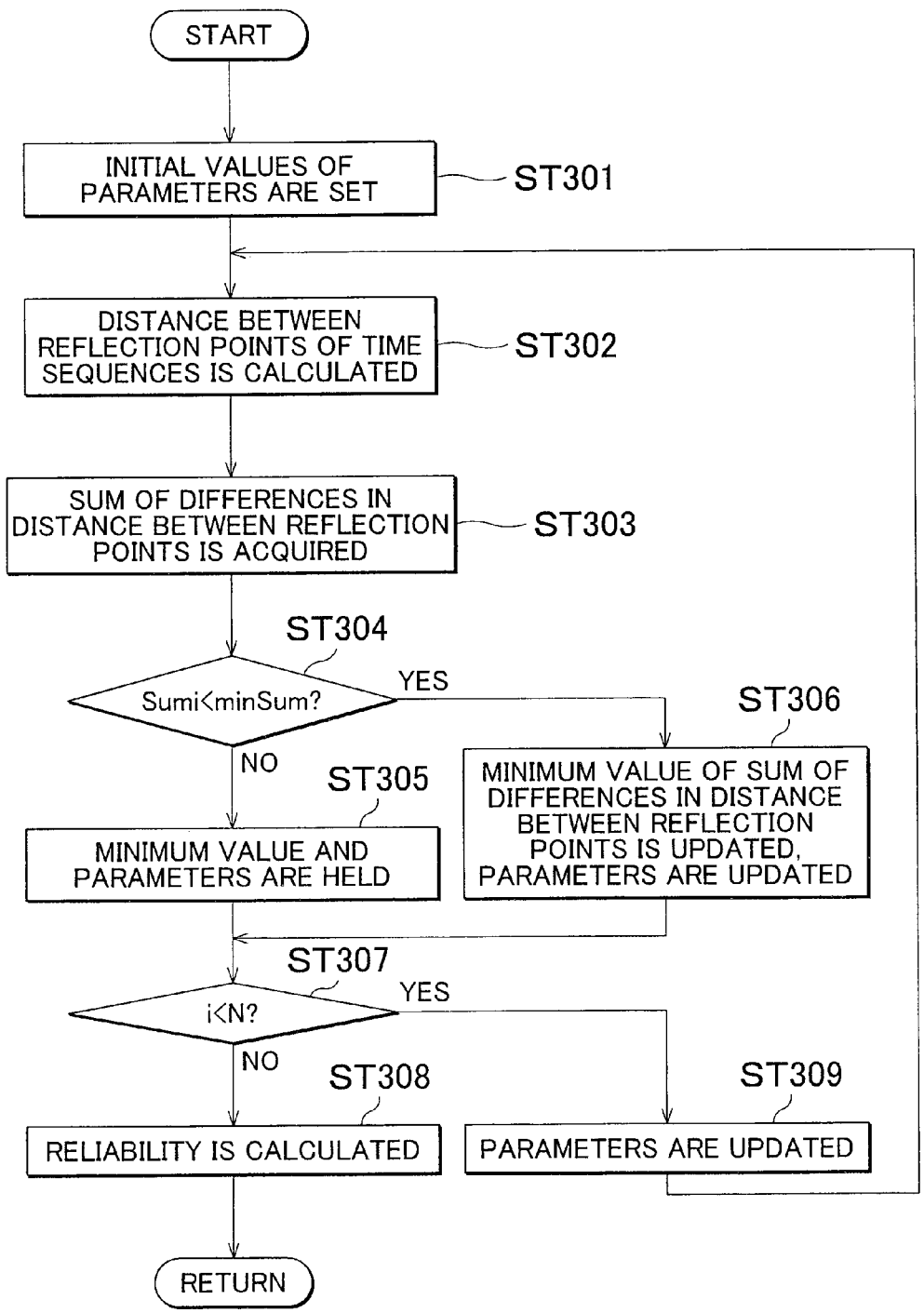
FIG. 7 is a flowchart illustrating a processing procedure in the case in which a drive state of the vehicle is estimated on the basis of detection results obtained with a radar in the embodiment of the invention.

FIG. 7 is a flowchart illustrating a processing procedure relating to the case in which a drive state of a vehicle is estimated on the basis of detection results obtained with a radar. The processing procedure in the case in which a drive state of the vehicle 1 is estimated on the basis of the detection result obtained with the radar 61, that is, in the case in which an angle variation or a translational movement amount of the vehicle 1 is estimated on the basis of the detection result obtained with the radar 61 will be explained below.

When an angle variation or a translational movement amount is estimated on the basis of the detection result obtained with the radar 61, first, the initial values of these parameters are set (step ST301). This setting of parameters is performed in the travelable region derivation unit 82 provided in the drive plan generating ECU 80. The travelable region derivation unit 82 sets the initial values of an angle variation or a translational movement amount when these parameters are estimated. The initial values are usually "0" in a state in which the vehicle 1 does not move.

A distance between reflection points of time sequences is then calculated (step ST302). The distance between reflection points of time sequences is calculated by the travelable region derivation unit 82 on the basis of the detection result obtained with the radar 61 and acquired by the radar detection result acquisition unit 86. Thus, the travelable region derivation unit 82 acquires continuously or with a predetermined time interval the detection result obtained with the radar 61 and acquired by the radar detection result acquisition unit 86 and calculates a variation of each reflection point between predetermined time sequences as a distance.

A sum of differences in distance to the reflection points is then calculated (step ST303). The sum of differences in distance to the reflection points is calculated by the travelable region derivation unit 82 on the basis of the detection result obtained with the radar 61 and acquired by the radar detection result acquisition unit 86. Thus, in the travelable region derivation unit 82, computations are conducted to determine the above-described sum of differences in distance to the reflection points on the basis of the detection result obtained with the radar 61 and the sum of differences in distance to the reflection points is calculated.

Then, it is determined whether (Sumi<minSum) (step ST304). In other words, the travelable region derivation unit 82 determines whether the sum (Sumi) of differences in distance to the reflection points calculated in the current processing loop of the processing procedure performed to estimate an angle variation or a translational movement amount of the vehicle 1 is less than a minimum value (minSum) of the present sum of differences in distance to the reflection points.

Where the condition (Sumi<minSum) is determined not to be satisfied, that is, the calculated sum (Sumi) of differences in distance to the reflection points is determined to be equal to or greater than the minimum value (minSum) of the present sum of differences in distance to the reflection points by the determination performed in the travelable region derivation unit 82, the minimum value and parameters are held (step ST305). In other words, when the calculated sum of differences in distance to the reflection points is determined to be equal to or greater than the minimum value of the present sum of differences in distance to the reflection points, the minimum value of the present sum of differences in distance to the reflection points is stored and parameters of angle variation or translational movement amount are also held.

By contrast, when the condition (Sumi<minSum) is determined to be satisfied, that is, the calculated sum (Sumi) of differences in distance to the reflection points is determined to be less than the minimum value (minSum) of the present sum of differences in distance to the reflection points by the determination performed in the travelable region derivation unit 82, the minimum value of the sum of differences in distance to the reflection points is updated and the parameters are updated (step ST306). In other words, (minSum=Sumi) is computed and the minimum value (minSum) of the present sum of differences in distance to the reflection points is updated to the value of the sum (Sumi) of differences in distance to the reflection points calculated in the current processing loop. When $(\Phi, \phi, \theta)$ are used as examples of parameters indicating an angular variation or a translational movement amount, if the present parameters are denoted by $(\Phi, \phi, \theta)$ and the parameters in the current loop are denoted by $(\Phi i, \phi i, \theta i)$, then $\{(\Phi, \phi, \theta)=(\Phi i, \phi i, \theta i)\}$ is computed. The parameters are thereby updated.

When the minimum value of the sum of differences in distance to the reflection points and the parameters are held (step ST305) or updated (step ST306), it is then determined whether (i<N) (step ST307). This determination is performed in the travelable region derivation unit 82. When a drive state of the vehicle 1 is estimated on the basis of the detection result obtained with the radar 61, the detection of reflection points is performed a plurality of times to estimate an angular variation or a translational movement amount by variations in detection results between time sequences, and "N", which is used for such determination in the travelable region derivation unit 82, is the number of times necessary to perform the detection of reflection points when estimating an angular variation or a translational movement amount of the vehicle 1. This "N" is set in advance and stored in the storage unit of the drive plan generating ECU 80.

Further, "i", which is used for determination in the travelable region derivation unit 82, is a value indicating a current processing loop, that is, a value indicating the number of times the reflection points are detected in the processing procedure of estimating an angular variation or a translational movement amount of the vehicle 1 by detecting the reflection points a plurality of times. By determining whether (i<N), the travelable region derivation unit 82 determines whether the number of times the reflection points are detected is the number of times necessary to determine an angular variation or a translational movement amount of the vehicle 1.

When a condition (i<N) is determined not to be satisfied, that is, a condition (i≥N) is determined to be satisfied by the determination performed in the travelable region derivation unit 82, reliability is calculated (step ST308). When a condition (i≤N) is determined to be satisfied and the number of times the reflection points are detected is determined to have reached the number of times necessary to estimate an angular variation or a translational movement amount of the vehicle 1, the estimation itself can be ended. Therefore, the travelable region derivation unit 82 then calculates reliability of estimation values obtained when such estimation was performed. The reliability is calculated by computing {1/α×(minimum value of sum of differences in distance between the reflection points)}. Here, "α" used in the computations is a predetermined coefficient used when reliability is calculated and this coefficient is stored in advance in the storage unit of the drive plan generating ECU 80. Once the reliability of the estimation values of the angular variation or translational movement amount has been calculated by such computations after the estimation thereof, the processing procedure is completed.

By contrast, when the condition (i<N) is determined to be satisfied by the determination performed in the travelable region derivation unit 82, the parameters are updated (step ST309). In other words, the travelable region derivation unit 82 updates the parameters used for estimating an angular variation or a translational movement amount on the basis of the distance between the reflection points of the time sequences calculated in the current processing loop (step ST302) or a sum of differences in distance to the reflection points (step ST303). Once the parameters have been updated, the flow returns to the processing of calculating again the distance between the reflection points of the time sequences (step ST302) and the above-described processing is repeated.

Determination of reliability of information in the case a posture of the vehicle 1 is estimated on the basis of the detection result obtained with the radar 61 will be explained below. First, the estimation of a posture of the vehicle 1 performed on the basis of the detection result obtained with the radar 61 is explained. When the posture is estimated on the basis of the detection result obtained with the radar 61, for example, a correlation between the orientation of reflection points and orientation of the host vehicle is determined and the posture is estimated by calculating the orientation of a succession of reflection points by the Hough transformation or the like. In other words, since the mounting angle of the radar 61 is obtained in advance and the detection orientation of the radar 61 in the vehicle 1 is also obtained in advance, the orientation of a succession of reflection points is calculated and the posture of the vehicle 1 is estimated from the correlation of the orientation of a succession of reflection points and the detection orientation of the radar 61.

More specifically, a curbstone of the road where the vehicle 1 is traveling is set as a reflection point that is used when detection is performed with the radar 61, and the detection result of the reflection stone detected with the radar 61 is acquired by the radar detection result acquisition unit 86. The detection result obtained in the radar 61 and acquired by the radar detection result acquisition unit 86 is transmitted to the travelable region derivation unit 82 and subjected to the Hough transformation in the travelable region derivation unit 82, whereby the successive orientation of reflection points of the curbstone is calculated. By calculating successive orientations of reflection points of the curbstone in such a manner, it is possible to estimate the relative positional relationship of the curbstone and the radar 61 and therefore it is possible to estimate the orientation of the host vehicle with respect to the curbstone orientation.

In this case, the relative positional relationship is measured by the radar 61. Therefore, when the posture of the vehicle 1 is estimated by using the radar 61, it is assumed that the posture is estimated with respect to the curbstone or the like. For this reason, when the orientation is erroneously detected when detecting the reflection points at the road edge, such as a curbstone, with the radar 61, a large error occurs in posture estimation performed with the radar 61. Thus, when the main orientation obtained from the reflection points when detection is performed with the radar 61 does not indicate the road edge, a posture estimation error increases. Therefore, when the successive orientation of reflection points of the curbstone is calculated by the Hough transformation, reliability of the estimated posture is evaluated according to the voting number of the Hough transformation. In other words, the determination increasing the reliability of calculated information is performed as the voting number in the direction of a curbstone increases and the determination decreasing the reliability of calculated information is performed as the voting number decreases when the Hough transformation is performed.

In the case in which reliability of information is determined when deriving a longitudinal road margin on the basis of the detection result with the radar 61, a determination method relating to estimation of a drive state and a determination method relating to estimation of a posture of the vehicle 1 may be used individually or a combination of these determination methods may be used. By conducting the determination with a combination of the determination methods, it is possible to increase further the accuracy of reliability determination.

Figure 8:
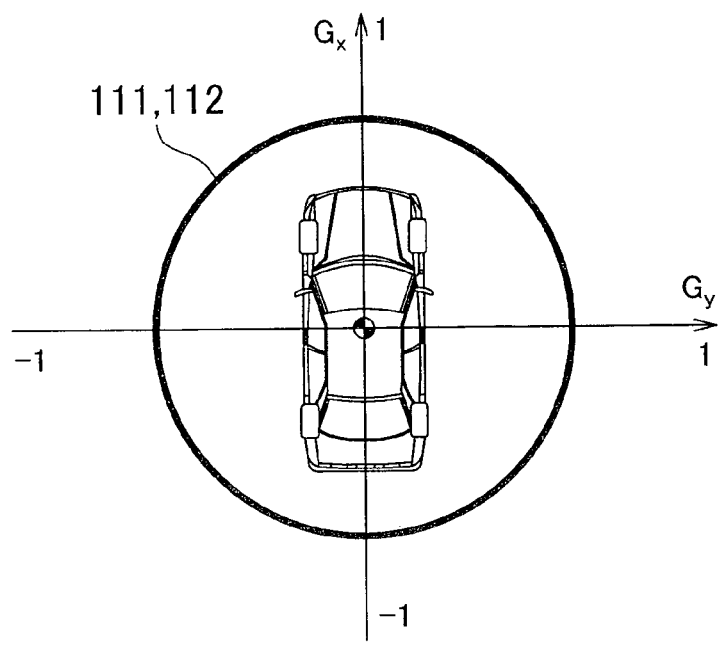
FIG. 8 is a schematic diagram illustrating a base model of a tire friction circle in the embodiment of the invention.

A method in which the travelable region derived by the travelable region derivation unit 82 is replaced with "μ" a tire friction circle will be explained below. FIG. 8 is a schematic diagram illustrating a base model of a tire friction circle. The tire friction circle, which serves as a basis for this method, will be described below. Since the wheels 5 are brought into contact with the road by a friction force, when acceleration or cornering is performed as the vehicle 1 travels, forces in various directions are generated between the wheels and the road according to the travel state of the vehicle 1 in the ground contact portions of the wheels 5, that is, ground contact portions of the tires. A force thus generated between the tires and the road depends on the friction force between the tires and the road and can occur in various directions according to the travel state of the vehicle 1 within the range of the friction force. In other words, when a large force is generated in one direction by the friction force between the tires and the road, forces that can be generated by the friction force in other directions decrease.

As for the maximum value of a tire generated force 112, which is a force that can be generated by the friction force between the tires and the road, the maximum value of a resultant force of a force generated in the transverse direction of the vehicle 1 and a force generated in the longitudinal direction is determined by the maximum value of the friction force. The maximum value of the resultant force so determined by the maximum value of the tire generated force 112 determined by the friction force between the tires and the road can be represented by a round tire friction circle 111 as shown in FIG. 8, and during the usual travel, the maximum value of the tire generated force 112 coincides with the tire friction circle 111.

Figure 9:
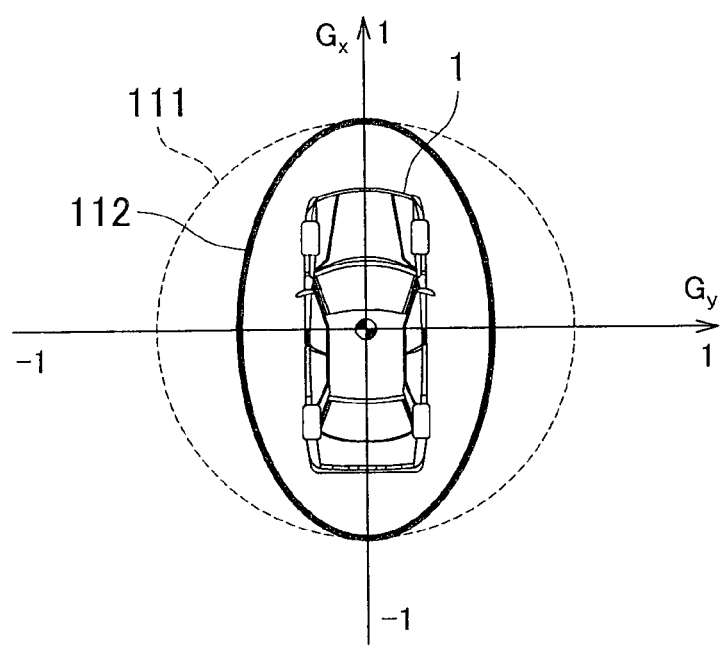
FIG. 9 is an explanatory drawing illustrating the case in which a limit of the tire generated force in the transverse direction is decreased in the embodiment of the invention.

FIG. 9 is an explanatory drawing illustrating the case in which a limit of the tire generated force in the transverse direction is decreased. When a travelable region is derived and defined by the travelable region derivation unit 82, the defined travelable region is replaced by "μ" of the tire friction circle 111 in the upper limit adjustment unit 98. For example, when the margin of the travelable region in the lateral direction is less than the margin of the travelable region, in the longitudinal direction, the maximum value of the tire generated force 112 in the transverse direction is decreased. In other words, when the maximum value of the tire generated force Gy in one (transverse) direction, from among the tire generated forces 112 coinciding with the tire friction circle 111 in the usual travel mode, is taken as 1, the maximum value in the opposite direction is taken as −1, the maximum value of the tire generated force Gx in one (longitudinal) direction is taken as 1, and the maximum value in the opposite direction is taken as −1, where the margin of the travelable region in the lateral direction is small, the absolute value of the maximum value of the generated force Gy in the transverse direction will be less than 1.

In this case, if the tire generated force Gx in the longitudinal direction is not to be changed from the tire generated force 112 in the usual travel mode, the tire generated force Gx in the longitudinal direction will coincide with the maximum value in the longitudinal direction of the tire friction circle 111, in the same manner as in the usual travel mode, and the absolute value of the maximum value is made 1. When a lateral margin of the defined travelable region is small, the absolute value of the maximum value of the tire generated force Gy in the transverse direction for the travel control is adjusted by the upper limit adjustment unit 98 so as to become less than the absolute value of the maximum value of the tire generated force Gy in the transverse direction in the usual travel mode.

Figure 10:
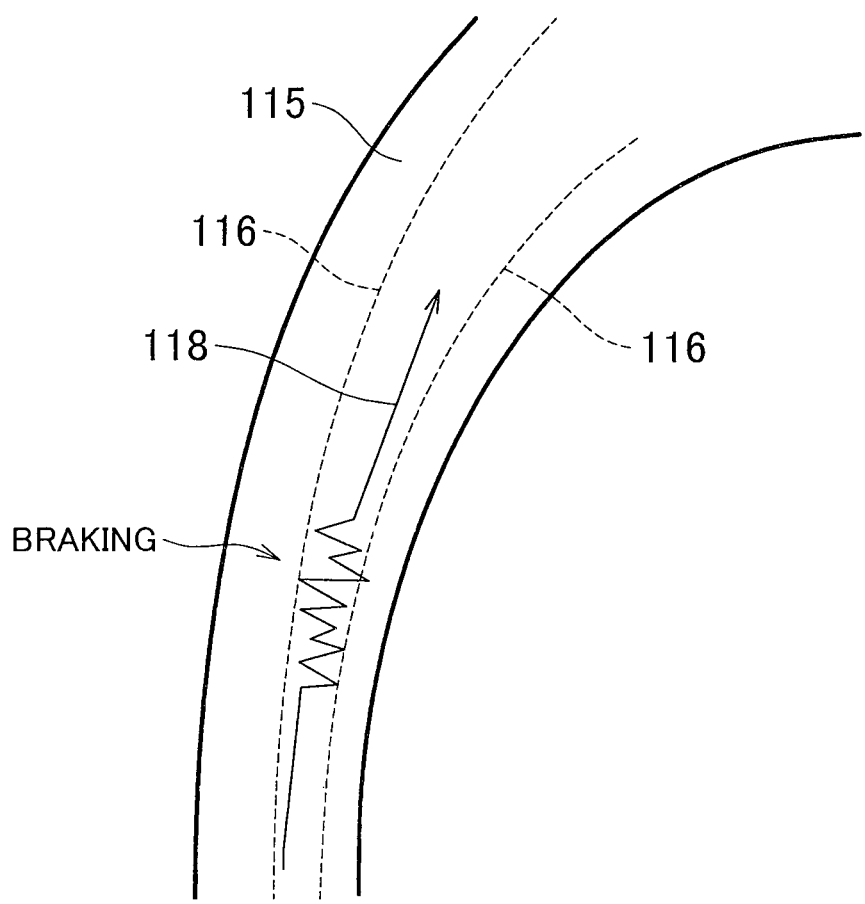
FIG. 10 is an explanatory drawing illustrating travel control in the case in which a limit of the tire generated force in the transverse direction is decreased in the embodiment of the invention.

FIG. 10 is an explanatory drawing illustrating travel control in the case in which a limit of the tire generated force in the transverse direction is decreased. When travel control of the vehicle 1 is performed, the control is performed within a range of the maximum value of the tire generated force 112 for the travel control that has been adjusted in the above-described manner by the upper limit adjustment unit 98. Therefore, when the absolute value of the maximum value of the tire generated force Gy in the transverse direction is decreased by the upper limit adjustment unit 98, an emphasis is placed on the tire generated force 112 in the longitudinal direction, and the travel control of the vehicle 1 is performed by placing an emphasis on braking.

In other words, the travelable region derivation unit 82 derives the lateral travelable region on the basis of the white line of the road recognized by the white line recognition unit 85, but when reliability of information obtained when the lateral travelable region is derived is low, the lateral travelable region is decreased. Therefore, in the road shape 116 after reliability determination, which is a shape of the road for performing control after the reliability during the travelable region derivation has been determined, the width is narrower than the actual width of a road 115 and a widthwise margin of the road decreases. Therefore, when travel control of the vehicle 1 is performed, the control amount in steering is reduced and the travel control is conducted by placing an emphasis on braking. Thus, in a travel plan 118 in this case, the steering amount is reduced and braking is emphasized.

More specifically, when reliability of information relating to the lateral travelable region derived on the basis of the detection result obtained by the camera 60 is low and the margin of the travelable region in the lateral direction is small, the control amount in steering is reduced by adjusting a gear ratio of steering in the VGRS 38 and decreasing a variation amount of orientation of the front wheel 6 with respect to the steering angle of the handle 30. Further, when reliability of information relating to the lateral travelable region derived on the basis of the detection result obtained with the camera 60 is low when performing the control that entrusts steering to the driver by applying a rotation torque from the EPS device 35 to the handle 30 in the direction in which the advance direction of the vehicle 1 is wished to be changed during the drive support control, the steering amount entrusted to the driver may be reduced by reducing this rotation torque. In other words, when reliability of information relating to the lateral travelable region derived on the basis of the detection result obtained with the camera 60 is low, the travel control of the vehicle 1 in the transverse direction is restricted by restricting the control amount of steering performed by the EPS device 35 or VGRS 38, which is an actuator performing travel control of the vehicle 1 in the transverse direction.

Figure 11:
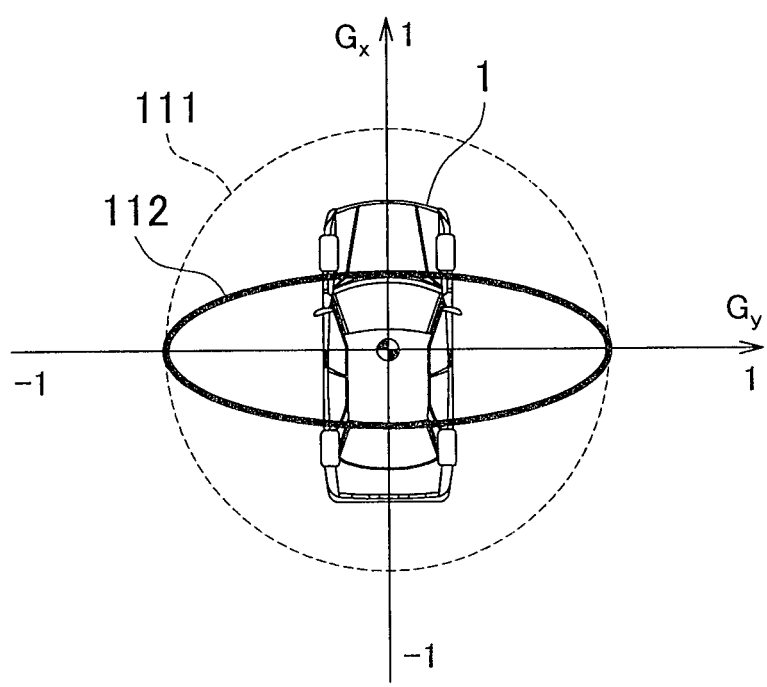
FIG. 11 is an explanatory drawing illustrating the case in which a limit of the tire generated force in the longitudinal direction is decreased in the embodiment of the invention.

FIG. 11 is an explanatory drawing illustrating the case in which a limit of the tire generated force in the longitudinal direction is decreased. When the margin of the travelable region in the longitudinal direction is less than the margin of the travelable region in the lateral direction, the maximum value of the tire generated force 112 in the longitudinal direction is decreased. In other words, when the margin of the travelable region in the longitudinal direction is small, the absolute value of the maximum value of the tire generated force Gx in the longitudinal direction is less than 1.

In this case, if the tire generated force Gy in the transverse direction is not to be changed from the tire generated force 112 in the usual travel mode, the tire generated force Gy in the transverse direction will coincide with the maximum value in the transverse direction of the tire friction circle 111, in the same manner as in the usual travel mode, and the absolute value of the maximum value is made 1. When a longitudinal margin of the defined travelable region is small, the absolute value of the maximum value of the tire generated force Gx in the longitudinal direction for the travel control is adjusted by the upper limit adjustment unit 98 so as to become less than the absolute value of the maximum value of the tire generated force Gx in the longitudinal direction in the usual travel mode.

Figure 12:
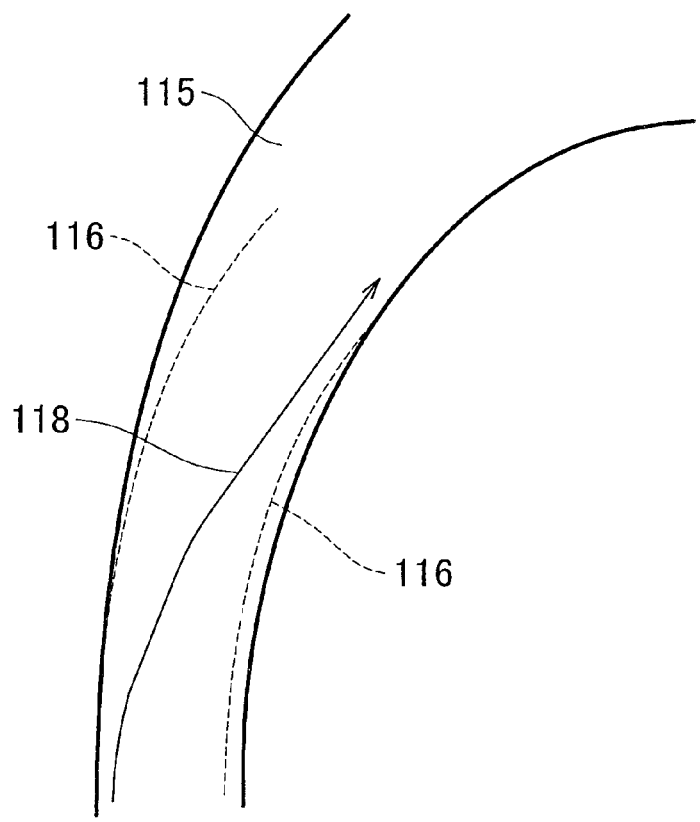
FIG. 12 is an explanatory drawing illustrating travel control in the case in which a limit of the tire generated force in the longitudinal direction is decreased in the embodiment of the invention.

FIG. 12 is an explanatory drawing illustrating travel control in the case in which a limit of the tire generated force in the longitudinal direction is decreased. When the absolute value of the maximum value of the tire generated force Gx in the longitudinal direction is decreased by the upper limit adjustment unit 98, an emphasis is placed on the tire generated force 112 in the transverse direction, and the travel control of the vehicle 1 is performed by placing an emphasis on steering. In other words, the travelable region derivation unit 82 derives the longitudinal road margin on the basis of the detection result obtained with the radar 61 and acquired by the radar detection result acquisition unit 86, but when reliability of information obtained when the longitudinal road margin is derived is low, the longitudinal road margin is reduced. Therefore, the road shape 116 after reliability determination, which is a shape of the road for performing control after the reliability during the travelable region derivation has been determined, does not change in the widthwise direction of the road 115. Therefore, the travel control of the vehicle 1 is performed by placing an emphasis on steering. Thus, in the travel plan 118 in this case, steering is superior to braking.

More specifically, when reliability of information relating to the longitudinal road margin derived on the basis of the detection result obtained with the radar 61 is low and the margin of the travelable region in the longitudinal direction is low, the control amount of the brake hydraulic control device 50 is reduced and the control amount in the longitudinal direction is restricted, thereby restricting the travel control of the vehicle 1 in the longitudinal direction.

Figure 13:
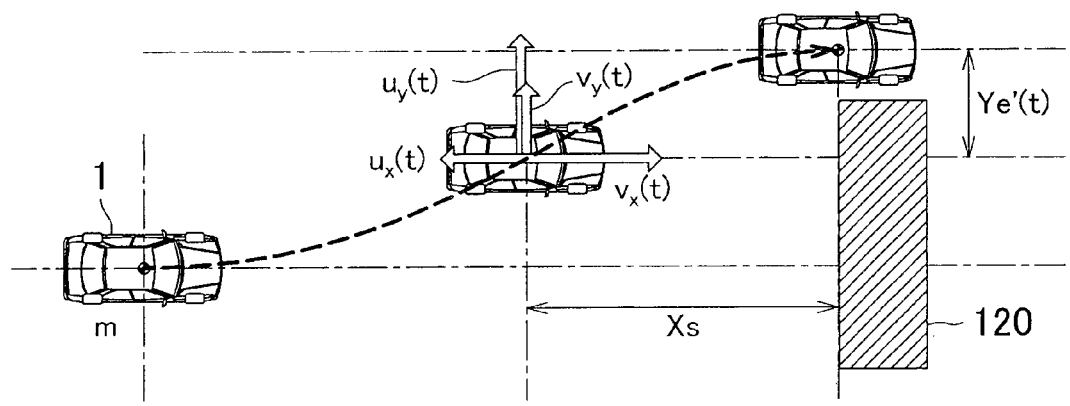
FIG. 13 is an explanatory drawing illustrating the case in which a travel path is computed according to the trajectory generation optimization algorithm in the embodiment of the invention.
Figure 14:
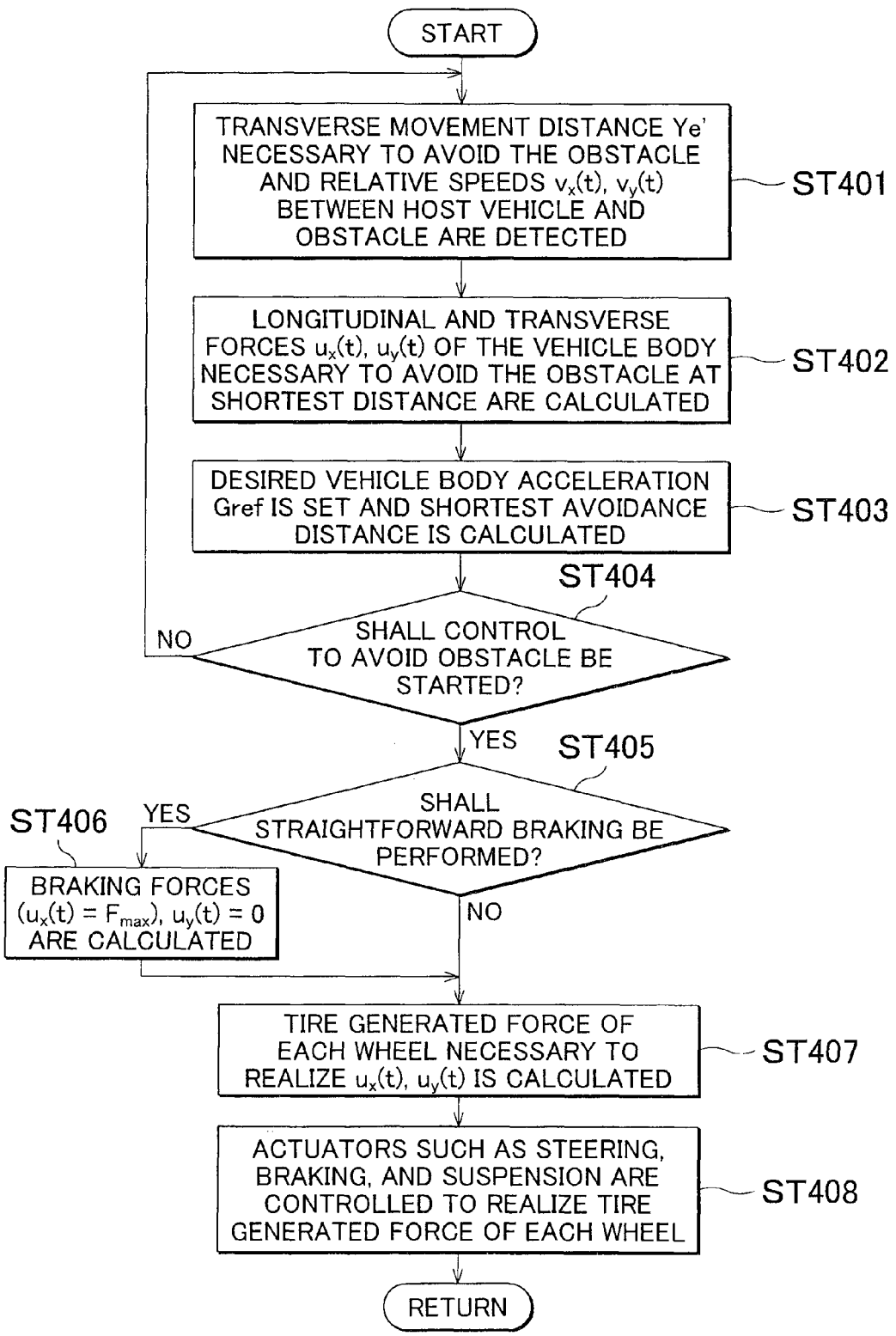
FIG. 14 is a flowchart of computation of the travel path performed according to the trajectory generation optimization algorithm in the embodiment of the invention.

The computation of travel path based on the trajectory generation optimization algorithm will be explained below. The trajectory generation optimization algorithm is an algorithm used when generating an optimum travel trajectory according to the detected conditions around the vehicle 1. FIG. 13 is an explanatory drawing illustrating the case in which a travel path is computed according to the trajectory generation optimization algorithm. FIG. 14 is a flowchart of computation of the travel path performed according to the trajectory generation optimization algorithm. When a travel path is computed with the trajectory generation optimization algorithm, first, a transverse movement distance Ye' necessary to avoid an obstacle and relative speeds $v_x(t)$, $v_y(t)$ of the host vehicle and an obstacle 120 are detected (step ST401). Among these parameters, the transverse movement distance Ye' is the movement amount necessary for an avoidance maneuver when the obstacle 120 is present in front of the vehicle 1 and the obstacle 120 is avoided by moving the vehicle 1 in the lateral direction. Further, among the relative speeds $v_x(t)$, $v_y(t)$ of the host vehicle and an obstacle 120, $v_x(t)$ is a relative speed of the vehicle 1 and the obstacle 120 in the longitudinal direction of the vehicle and $v_y(t)$ is a relative speed of the vehicle 1 and the obstacle 120 in the lateral direction of the vehicle.

The detection of these distance and speeds is performed by the obstacle state detection unit 91 included in the travel path calculation unit 90 of the drive plan generating ECU 80 on the basis of the detection result obtained with the radar 61 or the image picked up by the camera 60. When the obstacle state detection unit 91 recognizes the obstacle 120 on the basis of the image picked up by the camera 60 or the detection result obtained with the radar 61, the transverse movement distance Ye' and relative speeds $v_x(t)$, $v_y(t)$ of the host vehicle and an obstacle 120 are detected by time sequence variations of the picked-up image or the detection result obtained with the radar 61, in the same manner as in the case in which the drive state of the vehicle 1 or the posture of the vehicle 1 is calculated.

Longitudinal and transverse forces $u_x(t)$, $u_y(t)$ of the vehicle body necessary to avoid the obstacle at the shortest distance are then calculated (step ST402). This calculation is performed by the avoidance force calculation unit 92 included in the travel Path calculation unit 90. The avoidance force calculation unit 92 calculates the longitudinal force $u_x(t)$ of the vehicle body and the transverse force $u_y(t)$ of the vehicle body, which are forces necessary to avoid the obstacle at the shortest distance, on the basis of the transverse movement distance Ye' and relative speeds $v_x(t)$, $v_y(t)$ detected by the obstacle state detection unit 91, when the vehicle 1 avoids the obstacle 120 by changing the advance direction from the present advance direction.

Figure 15:
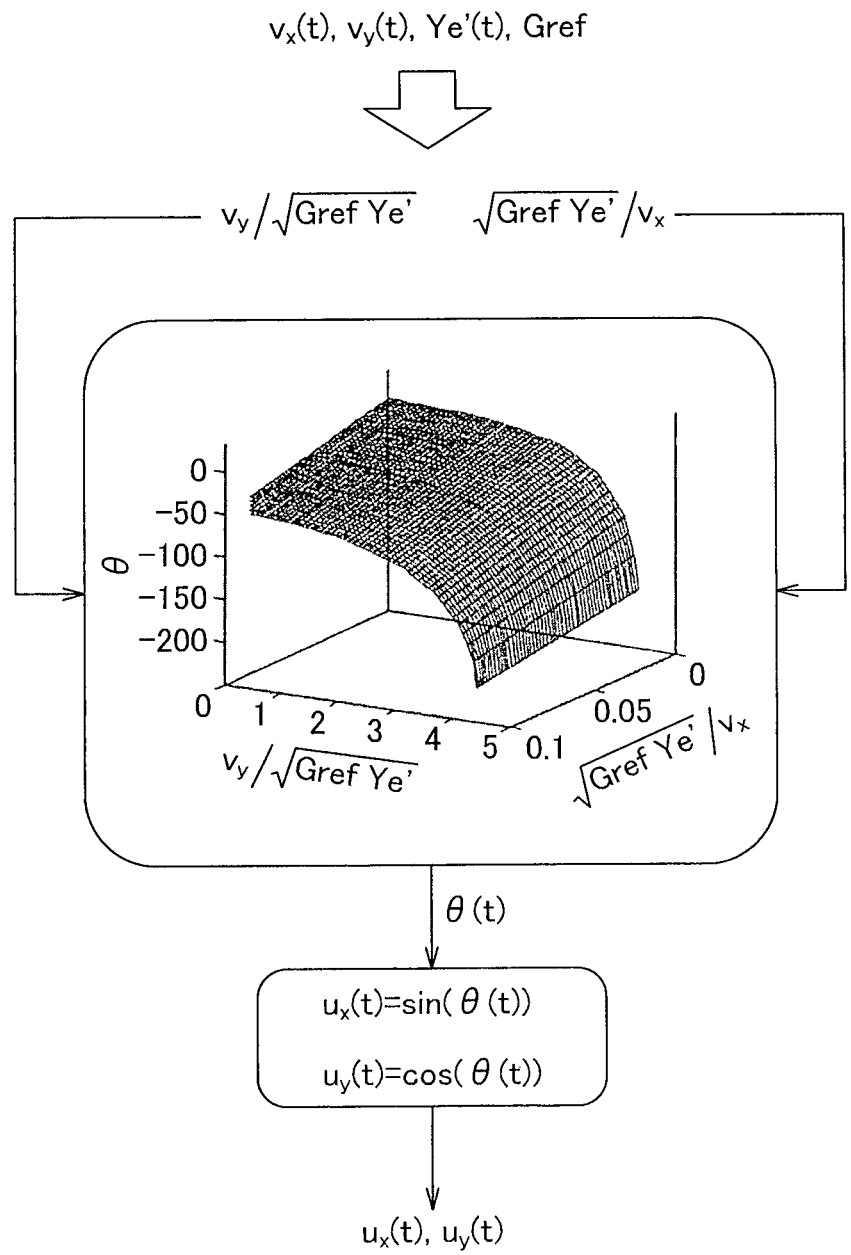
FIG. 15 is an explanatory drawing illustrating the calculation of longitudinal and transverse forces on the vehicle body that are necessary to realize the shortest avoidance in the embodiment of the invention.

FIG. 15 is an explanatory drawing illustrating the calculation of longitudinal and transverse forces on the vehicle body that are necessary to realize the shortest avoidance. First, the calculation of the longitudinal force $u_x(t)$ of the vehicle body and the transverse force $u_y(t)$ of the vehicle body will be summarized. When the longitudinal force $u_x(t)$ of the vehicle body and the transverse force $u_y(t)$ of the vehicle body are calculated, the calculation is performed by using a vehicle body acceleration (Gref), which is an acceleration of the vehicle 1 when the obstacle 120 is avoided, in addition to the transverse movement distance Ye' and relative speeds $v_x(t)$, $v_y(t)$. In other words, when the obstacle 120 is avoided by changing the advance direction of the vehicle 1, since the necessary force differs depending on acceleration attained when the advance direction is changed, the vehicle body acceleration (Gref) is also used when the longitudinal force $u_x(t)$ of the vehicle body and the transverse force $u_y(t)$ of the vehicle body are calculated.

When the longitudinal force $u_x(t)$ of the vehicle body and the transverse force $u_y(t)$ of the vehicle body are calculated by using these values, first, an angle $\theta(t)$ indicating the change in the orientation of the vehicle 1 is determined. When the angle $\theta(t)$ is calculated, the degree of variation in the longitudinal direction and transverse direction when avoiding the obstacle 120 are calculated by the following Equations (1) and (2) by using the transverse movement distance Ye' necessary to avoid the obstacle 120, the relative speeds $v_x(t)$, $v_y(t)$ of the host vehicle and the obstacle 120, and the vehicle body acceleration (Gref). The angle $\theta(t)$ is then calculated by fitting the degree of variation in the map indicating angular variations that is shown in FIG. 15. The map is set in advance and stored in the storage unit of the drive plan generating ECU 80. Further, the numerical values shown in the map in FIG. 15 illustrate an example of the map for calculating the angle $\theta(t)$, and the numerical values shown in FIG. 15 are not limiting.

$$v_y/\sqrt{GrefYe'} \quad (1)$$

$$\sqrt{GrefYe'}/v_x \quad (2)$$

Once the angle $\theta(t)$ has been calculated on the basis of Equations (1) and (2) and the map indicating angular variations, the longitudinal force $u_x(t)$ of the vehicle body and the transverse force $u_y(t)$ of the vehicle body are calculated by using the calculated angle $\theta(t)$ and Equations (3) and (4) below. Thus, the avoidance force calculation unit 92 calculates the longitudinal force $u_x(t)$ of the vehicle body and the transverse force $u_y(t)$ of the vehicle body by substituting the angle $\theta(t)$ in Equations (3) and (4).

$$u_x(t) = \sin(\theta(t)) \quad (3)$$

$$u_y(t) = \cos(\theta(t)) \quad (4)$$

The desired vehicle body acceleration (Gref) is then set and a shortest avoidance distance is calculated (step ST403). In other words, the shortest avoidance distance, which is the shortest distance between the host vehicle and the obstacle 120 that is necessary to avoid the obstacle 120, is calculated by the avoidance distance calculation unit 93 included in the travel path calculation unit 90. The shortest avoidance distance is thus calculated by the avoidance distance calculation unit 93, but the avoidance distance calculation unit 93 calculates the shortest avoidance distance by using the vehicle body acceleration (Gref). In this case, the vehicle body acceleration (Gref) can be given in advance as a fixed value or can be changed according to the conditions. Therefore, the avoidance distance calculation unit 93 calculates the shortest avoidance distance after setting the vehicle body acceleration (Gref) as necessary.

Figure 16:
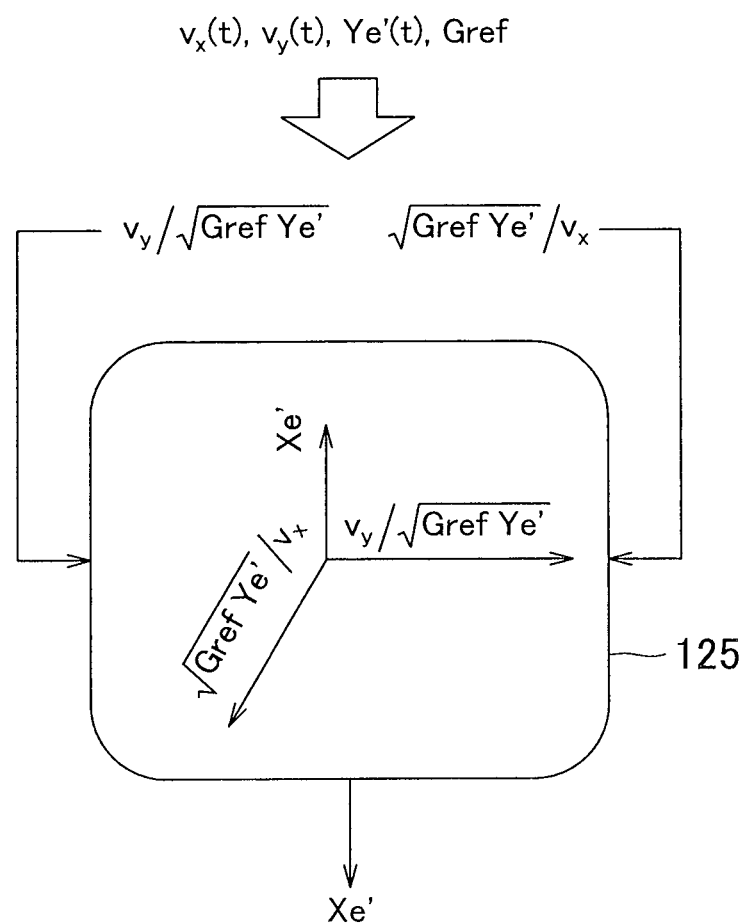
FIG. 16 is a schematic diagram illustrating means for calculating the shortest avoidance distance when a vehicle acceleration is given by a fixed value in the embodiment of the invention.

FIG. 16 is a schematic diagram illustrating means for calculating the shortest avoidance distance when the vehicle body acceleration (Gref) is given by a fixed value. First, the case in which the vehicle body acceleration (Gref) is given as a fixed value will be explained. A shortest avoidance distance Xe', which is the shortest distance for each relative state of the vehicle 1 and the obstacle 120 when the obstacle 120 is avoided, can be computed analytically. For this purpose, the shortest avoidance distance Xe' is calculated by using the transverse movement distance Ye' necessary to avoid the obstacle 120 and the relative speeds $v_x(t)$, $v_y(t)$ of the host vehicle and the obstacle 120 that have been computed in advanced, mapped, stored in the storage unit of the drive plan generating ECU 80 and detected by the obstacle state detection unit 91, and an avoidance distance calculation map 125 that is a map stored in the storage unit of the drive plan generating ECU 80. More specifically, the shortest avoidance distance Xe' is calculated by using the aforementioned Equations (1) and (2) and referring to the avoidance distance calculation map 125 and the vehicle body acceleration (Gref) is thereby, set.

Further, when the vehicle body acceleration (Gref) is changed in real time according to the conditions, the shortest avoidance distance Xe' is calculated by integrating the relative state of the vehicle 1 and the obstacle 120. More specifically, the avoidance pattern for avoiding the obstacle 120 can be determined when detecting the transverse movement distance Ye' necessary to avoid the obstacle 120 and the relative speeds $v_x(t)$, $v_y(t)$ of the host vehicle and the obstacle 120. Therefore, the shortest avoidance distance Xe' is calculated by using these parameters. In other words, the avoidance distance calculation unit 93 calculates the shortest avoidance distance Xe' by using the avoidance pattern, transverse movement distance Ye', relative speeds $v_x(t)$, $v_y(t)$, and vehicle body acceleration (Gref), changing the vehicle body acceleration (Gref) in real time according to conditions, and integrating.

Then, it is determined whether to start the control for avoiding the obstacle 120 (step ST404). This determination is performed by the control start determination unit 94 included in the travel path calculation unit 90. In this case, the control for avoiding the obstacle 120 can be conducted by various methods, depending on the shortest avoidance distance and the initial speed of the vehicle 1 when the control is started. Thus, the following three methods can be used when avoiding the obstacle 120: an avoidance method based only on steering, that is, an avoidance method based only on the transverse movement, an avoidance method based on straightforward braking, and an avoidance method based on optimum control in which control is performed by both the transverse movement and the braking. Therefore, whether to start the control is determined on the basis of the initial speed, the shortest avoidance distance, and the method used to avoid the obstacle.

Figure 17:
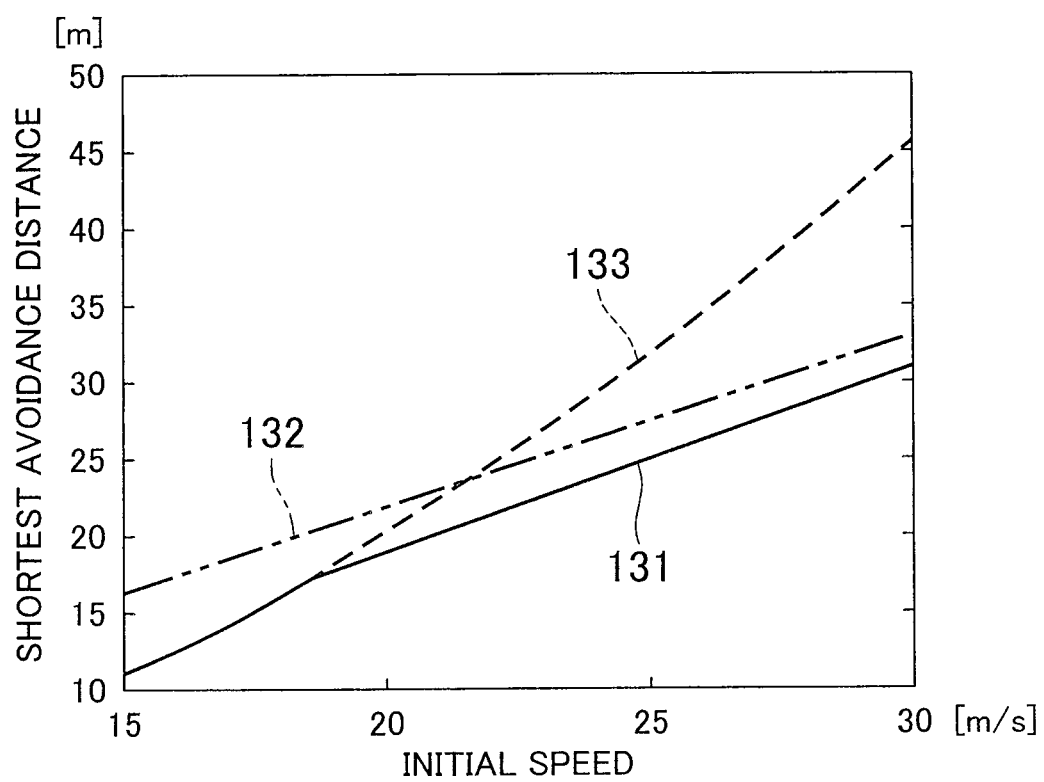
FIG. 17 is an explanatory drawing illustrating an example of a map to be used in determining whether to start the control in the embodiment of the invention.

FIG. 17 is an explanatory drawing illustrating an example of a map to be used in determining whether to start the control. The above-described three methods can be used to avoid the obstacle 120. The criteria for determining whether to start the control differ among the methods. These criteria are set in advance and stored in the form of a map in the storage unit of the drive plan generating ECU 80. When it is determined whether to start the control for avoiding the obstacle 120, the determination is made by the control start determination unit 94 by comparing the shortest avoidance distance calculated by the avoidance distance calculation unit 93 and the initial speed of the vehicle 1 with the map having the determination criteria set therein.

The map having the determination criteria set therein will be explained below. A criterion for determining whether to perform the control for avoiding the obstacle by transverse movement alone is set as a transverse movement avoidance distance 132, and the transverse movement avoidance distance 132 is determined by Equation (5) below. A criterion for determining whether to perform the control for avoiding the obstacle by straightforward braking is set as a straightforward braking avoidance distance 133, and the straightforward braking avoidance distance 133 is determined by Equation (6) below. Among the variables used in the Equations (5) and (6), "$v_0$" denotes an initial speed that is a vehicle speed at the time the computation of the travel path by the trajectory generation optimization algorithm is started, "m" denotes a weight of the vehicle 1, and "$F_{max}$" denotes a maximum braking force that can be generated in the present travel state. Among these variables, the detection result of the vehicle speed sensor 16 at the initial speed at the time the computation of the travel path by the trajectory generation optimization algorithm is started is used as the initial speed, and the weight of the vehicle 1 is stored in advance as a predetermined value in the storage unit of the drive plan generating ECU 80.

$$v_0 \sqrt{\frac{m}{2F_{max}}} Ye' \qquad (5)$$

$$\frac{m}{2F_{max}} v_0^2 \qquad (6)$$

Further, a criterion for determining whether to perform the control by both the transverse movement and the braking is set as an optimum control avoidance distance 131, and the optimum control avoidance distance 131 is set as a state in which portions of the transverse movement avoidance distance 132 and the straightforward braking avoidance distance 133 with the shortest avoidance distance shorter than that of the other distance are connected together.

FIG. 17 illustrates an example in which the initial speed of the vehicle 1 is plotted against the abscissa, the shortest avoidance distance is plotted against the ordinate, and the transverse movement distance Ye' necessary to avoid the obstacle 120 is 3 m, and the relationship between the initial speed and the shortest avoidance distance may be other than that shown in FIG. 17.

When it is determined whether to start the control for avoiding the obstacle 120 by using the determination criteria that are set in the above-described manner, the determination is made by comparing the state of the vehicle 1 and the obstacle 120 and the optimum control avoidance distance 131. In other words, it is determined that the control is to be started by the optimum control once the distance Xs (see FIG. 13) between the vehicle 1 and the obstacle 120 becomes equal to or less than the shortest avoidance distance corresponding to the initial speed $v_0$ of the vehicle 1 at a distance equal to or less than the optimum control avoidance distance 131.

Even when it is determined that the control for avoiding the obstacle 120 is to be started and the control for avoiding the obstacle 120 is actually started, there is a time lag before a transverse force of the tires is actually generated by performing the steering control or a brake force is actually generated by performing the braking control. Therefore, when it is determined whether to start the control of these types, it is preferred that a determination be made to start the control once the distance Xs between the vehicle 1 and the obstacle 120 becomes equal to or less than the shortest avoidance distance+α, and "α" used in the determination is preferably appropriately set according to the processing speed or operation speed of each device carried by the vehicle 1.

Once the control start determination unit 94 has determined not to start the control for avoiding the obstacle 120, the processing flow returns to a step of detecting the transverse movement distance Ye' necessary to avoid the obstacle 120 and the relative speeds $v_x(t)$, $v_y(t)$ of the host vehicle and the obstacle 120 (ST401).

When it is determined to start the control, it is then determined whether to perform straightforward braking (step ST405). This determination is performed by the straightforward braking determination unit 95 included in the travel path calculation unit 90. Whether to perform straightforward braking is determined by setting in advance a criterion for such determination and comparing the criterion for such determination with the travel state of the vehicle 1.

Figure 18:
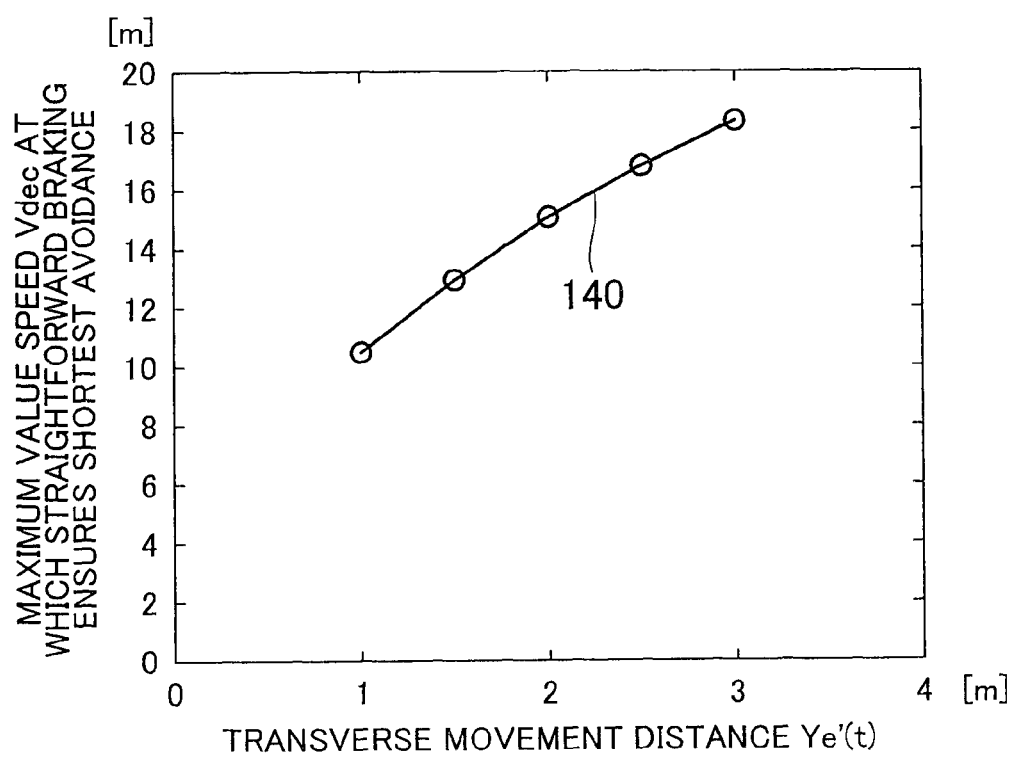
FIG. 18 is an explanatory drawing illustrating conditions under which straightforward braking ensures the shortest avoidance in the embodiment of the invention.

FIG. 18 is an explanatory drawing illustrating conditions under which straightforward braking ensures the shortest avoidance. The criterion for determining whether to perform straightforward braking will be explained below. A maximum vehicle speed $v_{dec}$ at which the straightforward braking ensures the shortest avoidance is set in advance as a straightforward braking determination criterion 140 for each transverse movement distance Ye' necessary to avoid the obstacle 120. The straightforward braking determination criterion 140 is stored in the form of a map in the storage unit of the drive plan generating ECU 80, and the straightforward braking determination unit 95 determines whether to perform straightforward braking by comparing this straightforward braking determination criterion 140 with the relative speed $v_x(t)$ of the host vehicle and the obstacle 120 detected by the obstacle state detection unit 91. More specifically, the straightforward braking determination unit 95 determines that straightforward braking be performed when the relative speed $v_x(t)$ of the host vehicle and the obstacle 120 is equal to or less than the maximum vehicle speed $v_{dec}$ corresponding to the transverse movement distance Ye' in the straightforward braking determination criterion 140, that is, when $(v_x(t) \leq v_{dec})$.

FIG. 18 illustrates an example of relationship between the transverse movement distance Ye' necessary to avoid the obstacle 120 and the maximum vehicle speed $v_{dec}$ at which the straightforward braking ensures the shortest avoidance, and the relationship between the transverse movement distance Ye' and the maximum vehicle speed $v_{dec}$ may be other than that shown in FIG. 18.

When it is determined to perform straightforward braking, a braking force $\{(u_x(t)=F_{max}), u_y(t)=0\}$ is calculated (step ST406). This calculation is performed by the control amount calculation unit 96 included in the travel path calculation unit 90. When it is determined to perform straightforward braking, the control amount calculation unit 96 substitutes $F_{max}$, which is the maximum braking force, as $u_x(t)$, which is a longitudinal force of the vehicle body necessary to avoid the obstacle at the shortest distance, and sets $u_y(t)$, which is a transverse force of the vehicle body necessary to avoid the obstacle at the shortest distance, to zero. As a result, in order to avoid the obstacle 120 at the shortest distance, the calculation is performed such that a force in the braking direction is generated only in the longitudinal direction of the vehicle 1, that is, such that a force in the deceleration direction is generated, and no force for avoiding the obstacle 120 is generated in the transverse direction of the vehicle 1.

When it is determined not to perform straightforward braking on the basis of determination in the straightforward braking determination unit 95 (step ST405), or when it is determined to perform straightforward braking on the basis of determination in the straightforward braking determination unit 95 (step ST405) and the calculation of $\{u_x(t)=F_{max}, u_y(t)=0\}$ is performed in the control amount calculation unit 96 (step ST406), tire generated forces for all wheels necessary to realize the $u_x(t)$, $u_y(t)$ are calculated (step ST407). This calculation is performed in the control amount calculation unit 96. The control amount calculation unit 96 calculates a tire generated force for each wheel, which is a tire generated force for each wheel 5 necessary to realize the longitudinal force $u_x(t)$ of the vehicle body and the transverse force $u_y(t)$ of the vehicle body necessary to avoid the vehicle at the shortest distance (these forces have been calculated by the avoidance force calculation unit 92), by using the map that has been set in advance and stored in the storage unit or a relationship for calculating a tire generated force.

Where straightforward braking is performed, when the computation $\{u_x(t)=F_{max}, u_y(t)=0\}$ is performed by determination in the straightforward braking determination unit 95, the control amount calculation unit 96 calculates a tire generated force for each wheel which is necessary to realize the $u_x(t)$, $u_y(t)$ after the computation.

The actuators for steering, braking, and suspension are then controlled so as to realize the tire generated force for each wheel (step ST408). In this case, the actuators that are used when causing the vehicle 1 to travel, such as the engine 12, VGRS 38, and brake hydraulic control device 50, are controlled with control units provided in the drive control ECU 70, so as to realize the tire generated force for each wheel calculated by the control amount calculation unit 96. As a result, the tire generated force for each wheel is realized by changing the drive force or brake force of the wheels 5 or changing the transverse force according to the tire generated force for each wheel.

Figure 19A:
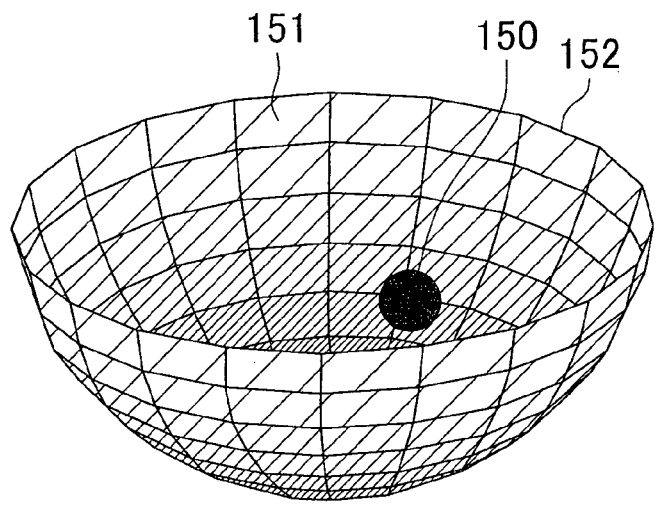
FIG. 19A is a schematic diagram relating to the case in which travel control of the vehicle is performed with the vehicle control device according to the related art.
Figure 19B:
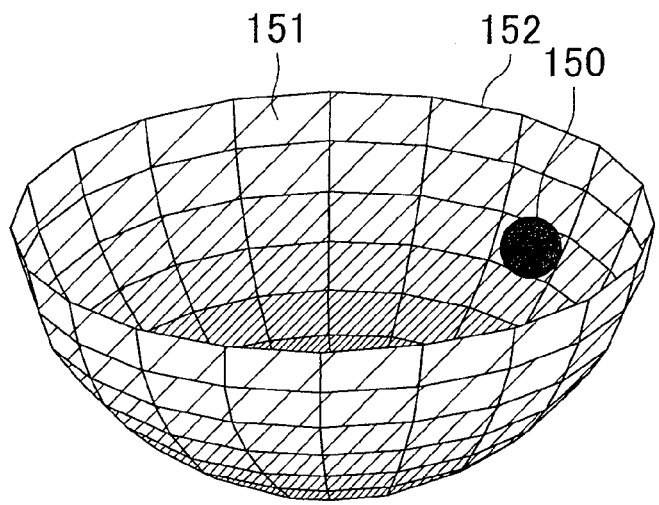
FIG. 19B is an explanatory drawing illustrating a state that is closer to the control limit than that shown in FIG. 19A in the configuration according to the related art.
Figure 19C:
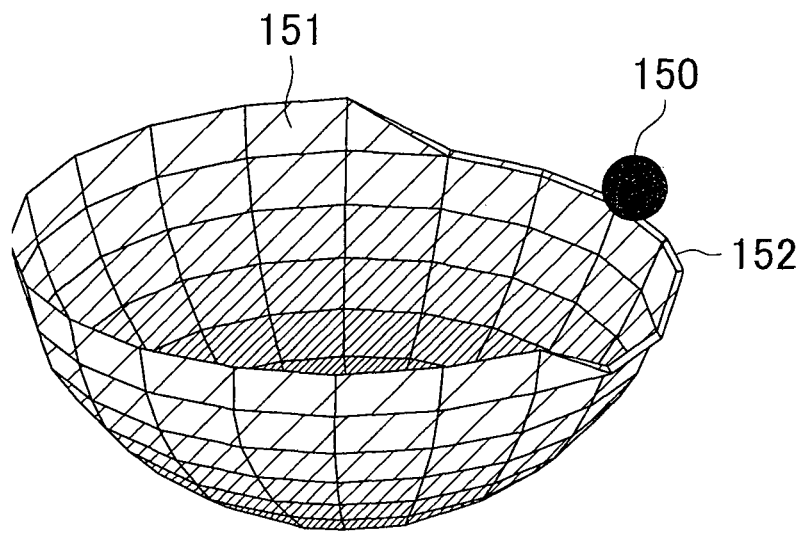
FIG. 19C is an explanatory drawing illustrating a state in which control is performed on the control limit during the control performed with the vehicle control device according to the related art.
Figure 19D:
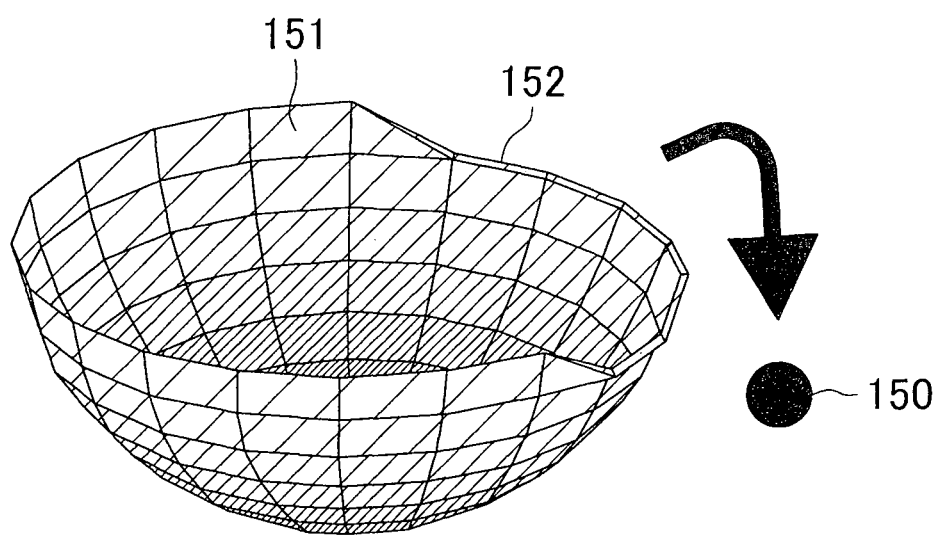
FIG. 19D is an explanatory drawing illustrating a state in which the control limit is exceeded during the control performed with the vehicle control device according to the related art.

FIG. 19A is a schematic diagram relating to the case in which travel control of the vehicle is performed with the vehicle control device according to the related art. FIG. 19B is an explanatory drawing illustrating a state that is closer to the control limit than that shown in FIG. 19A. FIG. 19C is an explanatory drawing illustrating a state in which control is performed on the control limit during the control performed with the vehicle control device according to the related art. FIG. 19D is an explanatory drawing illustrating a state in which the control limit is exceeded during the control performed with the vehicle control device according to the related art. The difference between the travel control of the vehicle 1 performed with the vehicle control device according to the related art and the travel control of the vehicle 1 performed with the vehicle control device 2 of the present embodiment will be described below. The travel control of the vehicle 1 performed with the vehicle control device according to the related art will be explained by using a schematic diagram relating to the case in which behavior 150 of the vehicle 1 is represented by a sphere, a control range 151 is represented by a hemisphere, and a control limit 152 is presented by an edge of the hemisphere, as shown in FIGS. 19A to 19D. In the usual travel state, the control is performed such that the behavior 150 of the vehicle 1 is positioned on the inside of the control range 151 (FIG. 19A). In this state, where the vehicle travels under drive support control, while the conditions around the vehicle 1 are being detected, for example, when the vehicle 1 approaches an obstacle and travels to avoid the obstacle, a load placed on the wheels 5 by the operations performed to avoid the obstacle increases and the behavior 150 of the vehicle 1 approaches the control limit 152 (FIG. 19B).

Where the obstacle is thus avoided, the control limit 152 decreases when a state is assumed in which the control is restricted and a load on the wheels 5 is further increased, for example, when the road width is less than the assumed width, the advance direction of the vehicle 1 therefore cannot be changed and the obstacle has to be avoided only by braking. In this case, the behavior 150 of the vehicle 1 easily reaches the control limit 152 (FIG. 19C). When the vehicle travels under the drive support control performed by the vehicle control device according to the related art, while the conditions around the vehicle 1 are being detected, where the conditions are such that reliability of information obtained by the travel condition detection means frequently changes, the control in which the surrounding conditions are detected is difficult to maintain continuously. For this reason, when the detected information is not adequate and the behavior 150 of the vehicle 1 reaches the control limit 152 for this reason, a state is assumed in which the control of behavior 150 of the vehicle 1 has no margin, thereby the behavior 150 of the vehicle 1 exceeds the control limit 152 and easily collapses (FIG. 19D).

Figure 20A:
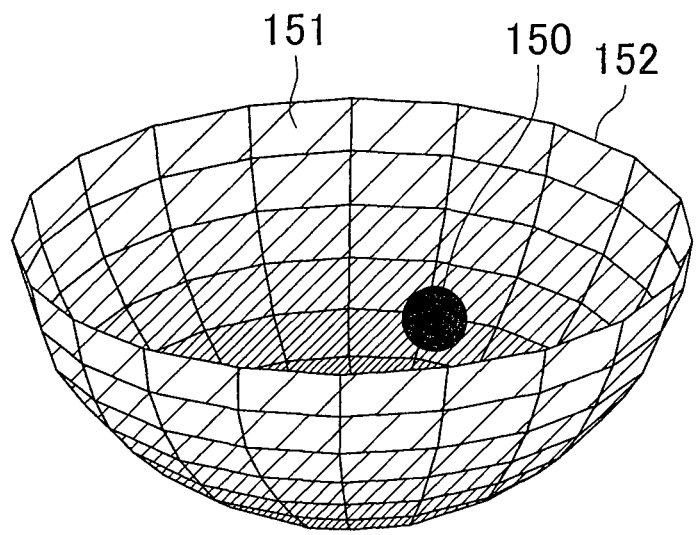
FIG. 20A is a schematic diagram relating to the case in which vehicle travel control is performed with the vehicle control device according to the embodiment of the invention.
Figure 20B:
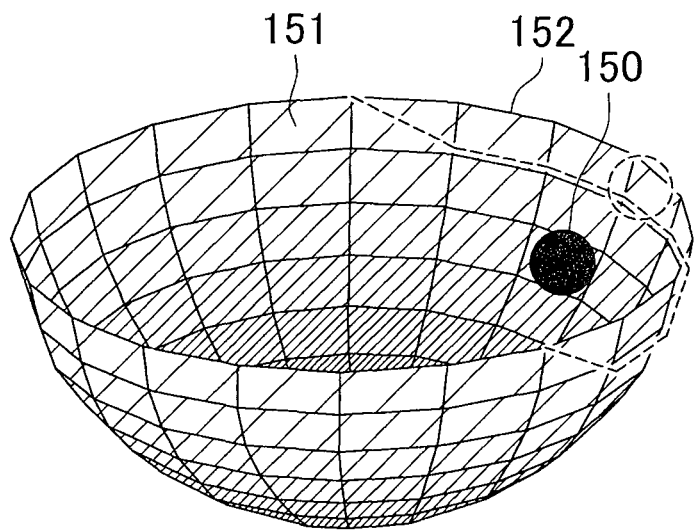
FIG. 20B is an explanatory drawing illustrating a state in which a control limit is detected with the vehicle control device according to the embodiment of the invention.
Figure 20C:
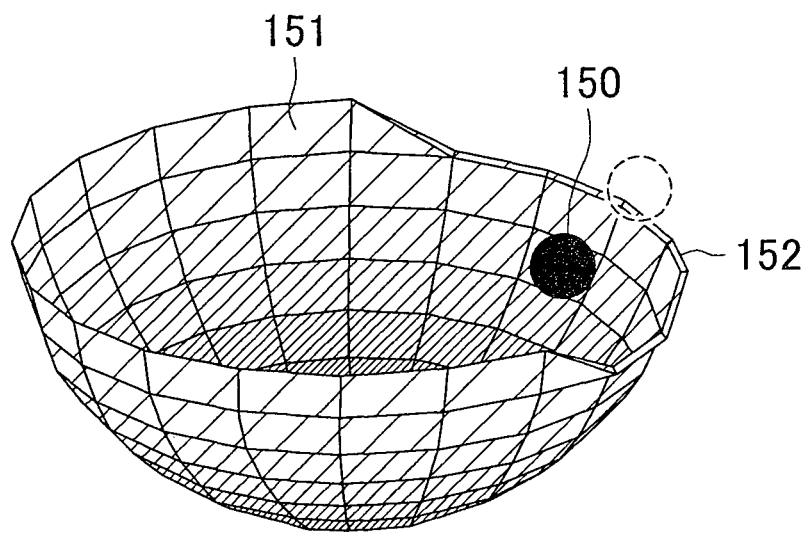
FIG. 20C is an explanatory drawing illustrating a state in which a control limit is detected with the vehicle control device according to the embodiment of the invention.
Figure 20D:
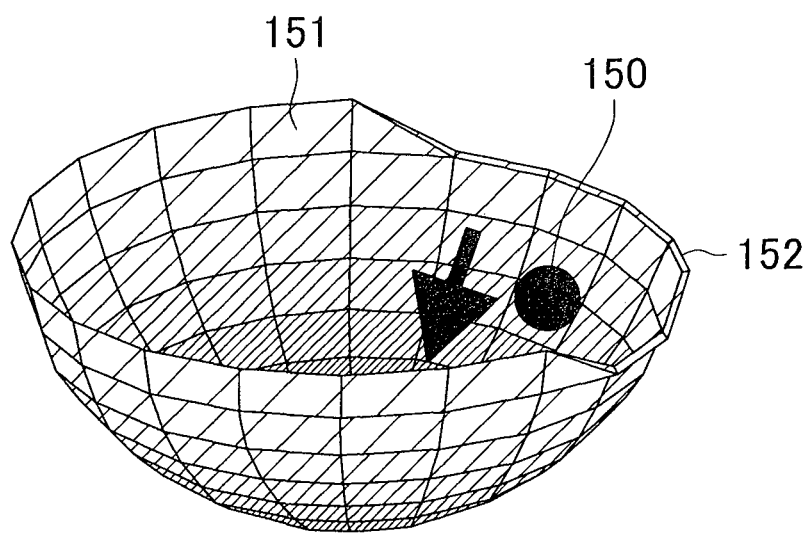
FIG. 20D is an explanatory drawing illustrating a state in which the control is performed within a control limit range in the vehicle control device according to the embodiment of the invention.

FIG. 20A is a schematic diagram relating to the case in which vehicle travel control is performed with the vehicle control device according to the embodiment. FIG. 20B is an explanatory drawing illustrating a state in which a control limit is detected with the vehicle control device according to the embodiment. FIG. 20C is an explanatory drawing illustrating a state in which a control limit is detected with the vehicle control device according to the embodiment. FIG. 20D is an explanatory drawing illustrating a state in which the control is performed within a control limit range in the vehicle control device according to the embodiment. By contrast with the travel control of the vehicle 1 performed under the drive support control in the vehicle control device according to the related art, with the travel control of the vehicle 1 performed under the drive support control in the vehicle control device 2 of the present embodiment, the travel control of the vehicle 1 is performed according to reliability of information obtained when conditions around the vehicle 1 are detected with the travel condition detection means. First, when the vehicle travels, while the conditions around the vehicle 1 are being detected, the control is performed such that the behavior 150 of the vehicle 1 is positioned on the inside of the control range 151 by performing the travel control on the basis of the detected information (FIG. 20A). In the usual travel state under the drive support control, the control is thus performed such that the behavior 150 of the vehicle 1 is positioned on the inside of the control range 151, and in this case, the control limit 152 is also detected with good accuracy by determining the reliability of the detected information (FIG. 20B).

Where reliability of the detected information is determined when conditions around the vehicle 1 are detected and the reliability is determined to be low, a reduction amount of the information for which the reliability has been determined to be low is increased. For example, when a road width is detected and reliability of information relating to the detected road width is determined to be low, a reduction amount of the detected road width is increased and a travelable region is decreased. As a result, it is difficult to perform travel control of the vehicle 1 in the limit region of information with low reliability, from among the types of information relating to the detected surrounding conditions, and therefore the behavior 150 of the vehicle 1 can hardly come close to the control limit 152 (FIG. 20C).

Where travel control is performed by detecting the conditions around the vehicle 1, even when information with low reliability is present, the behavior 150 of the vehicle 1 can be prevented from approaching the control limit 152 by increasing the reduction amount of information when the reliability is thus determined to be low. As a result, significant disturbance of the behavior 150 of the vehicle 1 caused by increase in a load on the wheels 5 can be inhibited and therefore travel control can be reduced to the usual control state even under conditions such that the behavior 150 of the vehicle 1 comes close to the control limit 152 due to a low reliability of the detected information (FIG. 20D).

The above-described vehicle control device 2 restricts a control amount of some actuators, from among a plurality of actuators that enable the vehicle 1 to travel, such as the VGRS 38 and brake hydraulic control device 50, according to reliability of a plurality of types of information detected by a plurality of travel condition detection means such as the camera 60 and the radar 61. As a result, even when reliability of information detected by the travel condition detection means provided in plurality changes, adequate travel control corresponding to reliability of information can be performed. As a result, travel control of the vehicle 1 can be performed with a better accuracy.

When the control amount of some of the actuators is restricted according to reliability of a plurality of pieces of the information detected by the travel condition detection means, the actuator for which the control amount is restricted is changed according to the travel condition detection means that has detected the information. Therefore, adequate travel control corresponding to reliability of information can be performed more reliably. As a result, accurate travel control of the vehicle 1 can be performed more reliably.

The plurality of travel condition detection means includes the camera 60, which is transverse condition detection means for measuring a position of the vehicle 1 in the transverse direction, and when reliability of information detected by the camera 60 is low, the control amount of the EPS device 35 or the VGRS 38, which is the actuator performing travel control of the vehicle 1 in the transverse direction, is restricted. As a result, when reliability of information detected by the camera 60 is low and reliability of information relating to conditions in the transverse direction of the vehicle 1 is low, travel control of the vehicle 1 in the transverse direction can be restricted and therefore more adequate travel control can be performed. As a result, accurate travel control of the vehicle 1 can be performed more reliably.

Further, when reliability of information relating to conditions in the transverse direction of the vehicle 1 is thus low, by restricting the travel control of the vehicle 1 in the transverse direction, it is possible to perform travel control with high safety. In other words, when a vehicle travels on a road having a plurality of lanes in one direction, for example, a high-speed road, even when a low-speed vehicle is present in front of the host vehicle, changing a lane and passing have a number of advantages over decelerating by braking. Thus, no feel of uneasiness in induced, unnecessary braking is prevented, and increase in fuel consumption can be inhibited. Therefore, in the usual travel control, the control in the traverse direction has a priority and changing a lane also has a priority, but when reliability of information detected by the camera 60 is low, travel control with low reliability can be avoided by restricting travel control of the vehicle 1 in the transverse direction. As a result, safety of traveling in the vehicle 1 can be increased.

The plurality of travel condition detection means includes the radar 61, which is longitudinal condition detection means for measuring a position of the vehicle 1 in the longitudinal direction, and when reliability of information detected by the radar 61 is low, the control amount of the brake hydraulic control device 50, which is the actuator performing travel control of the vehicle 1 in the longitudinal direction, is restricted. As a result, when reliability of information detected by the radar 61 is low and reliability of information relating to conditions in the longitudinal direction of the vehicle 1 is low, travel control of the vehicle 1 in the longitudinal direction can be restricted and therefore more adequate travel control can be performed. As a result, accurate travel control of the vehicle 1 can be performed more reliably.

In the vehicle control device 2 of the embodiment, a control amount of some actuators, from among a plurality of actuators that enable the vehicle 1 to travel, is restricted according to reliability of a plurality of types of information detected by a plurality of travel condition detection means, but when the control amount of some actuators is thus restricted, the control amount of other actuators, from among the plurality of actuators, may be increased. By so increasing the control amount of other actuators for which the decrease in the control amount is not required when decreasing the control amount of some actuators, it is possible to perform adequate and more reliable travel control according to reliability of information.

For example, when the control amount of the EPS device 35 or the VGRS 38, which is an actuator performing travel control of the vehicle 1 in the transverse direction, is restricted due to the low reliability of information detected by the transverse conditions detection means such as the camera 60, the control amount of actuators performing travel control of the vehicle 1 in the longitudinal direction, such as the brake hydraulic control device 50, from among the plurality of actuators, may be increased. Conversely, when the control amount of the brake hydraulic control device 50, which is the actuator performing travel control of the vehicle 1 in the longitudinal direction, is restricted due to the low reliability of information detected by the longitudinal condition detection means such as the radar 61, the control amount of actuators performing travel control of the vehicle 1 in the transverse direction, such as the VGRS 38, from among the plurality of actuators, may be increased. Thus, when reliability of information detected by some travel condition detection means is low, by so increasing the control amount of actuators other than the actuators operating according to the detection result obtained with these travel condition detection means, it is possible to perform adequate travel control even when deriving information with low reliability. As a result, accurate travel control of the vehicle 1 can be performed more reliably.

Further, when the control amount of other actuators for which the decrease in the control amount is not required is increased when reliability of information detected by the travel condition detection means is low, the control amount may be increased with the object other than simply avoiding the obstacle 120. For example, the control amount of other actuators may be increased to impose predetermined limitations, e.g. reduce feel of uneasiness, ensure timely arrival, improve fuel consumption, reduce risk potential, and improve ride feel by reducing feeling of gravity, pitch, and bouncing in all directions. Therefore, certain limitations can be imposed on the vehicle travel mode, while inhibiting travel control based on detection results with low reliability of information. As a result, the desired travel mode can be realized, while performing travel control of the vehicle 1 with good accuracy.

Further, in the vehicle travel device 2 of the present embodiment, the camera 60 is used as the transverse condition detection means, the radar 61 is used as the longitudinal condition detection means, and the car navigation system 65 is used as the other travel condition detection means, but other devices may be used as the travel condition detection means including the transverse condition detection means and the longitudinal condition detection means. Even when other means are used as the travel condition detection means, inadequate control can be inhibited when performing travel control of the vehicle 1 by drive support control, by determining reliability of the detected information and adjusting the amount control of the actuators performing the travel control of the vehicle 1 according to the determined reliability. As a result travel control of the vehicle 1 can be performed with good accuracy.

Further, when steering control is performed during drive support control, devices other than the VGRS 38 and the EPS device 35 may be used. For example, it is possible to provide a stabilizer actuator 45 (see FIG. 1) that can adjust a transmission ratio when transmitting action in the vertical direction of the wheels 5 between the left and right wheels 5 in a stabilizer 40 (see FIG. 1) that connects together the left and right suspension units of the vehicle 1 together and to perform steering control of the vehicle 1 by adjusting the transmission ratio. Thus, the stabilizer actuator 45 may be used as an actuator performing travel control of the vehicle 1 in the transverse direction. By controlling the stabilizer actuator 45, it is possible to adjust a load applied to the left and right wheels 5 or to the front and rear wheels 5, and because a turning force of the vehicle 1 in response to the steering angle changes accordingly, it is possible to control the actual turning force to the desired turning force. As a result, the variation in the advance direction of the vehicle 1 in response to the steering angle can be increased or, conversely, decreased and steering control can be performed.

As for the methods for determining reliability of information in the case in which conditions around the vehicle 1 are detected by the camera 60, radar 61, and car navigation system 65 serving as travel condition detection means provided in plurality, a plurality of determination methods can be used in respective travel condition detection means, but any combination of these determination methods may be used for determining reliability of information. By combining the methods for determining information relating to each travel state detection means according to the conditions around the vehicle 1 and the travel state of the vehicle 1 and determining reliability by the combination of determination methods, it is possible to determine reliability easier and more accurately. As a result, travel control of the vehicle 1 can be performed with better accuracy.

As described hereinabove, the vehicle control device in accordance with the invention is useful for a vehicle in which travel control is performed, while detecting conditions around the vehicle, and is particularly suitable for a vehicle having a plurality of detection means as detection means for detecting conditions around the vehicle.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A vehicle control device comprising:
a plurality of electronic travel condition detection devices configured to detect conditions around a vehicle;
a plurality of mechanical actuators configured to enable the vehicle to travel; and
a controller that performs travel control of the vehicle according to the conditions around the vehicle by controlling the plurality of actuators, according to information detected by the travel condition detection devices, thereby assisting driving operations performed by a driver, wherein:
a control amount of at least one of the actuators, from among the plurality of actuators, is restricted according to reliability of a plurality of pieces of the information detected by the plurality of travel condition detection devices, and
when a control amount of at least one of the actuators is restricted according to reliability of a plurality of pieces of the information detected by the plurality of travel condition detection devices, a control amount of another actuator, from among the plurality of actuators, is increased.

2. The vehicle control device according to claim 1, wherein a control amount, of at least one of the actuators, from among the plurality of actuators, is restricted according to reliability of a plurality of pieces of the information detected by the plurality of travel condition detection devices, when the reliability of the information is low.

3. The vehicle control device according to claim 1, wherein when a control amount of at least one of the actuators is restricted according to reliability of a plurality of pieces of the information detected by the plurality of travel condition detection devices, the actuator for which the control amount is restricted is changed according to the travel condition detection device that has detected the information.

4. The vehicle control device according to claim 3, wherein when the reliability of the information detected by at least one of the travel condition detection devices, from among the plurality of travel condition detection devices, is low, a control amount of at least one of the actuators is restricted so as to restrict the travel control of the vehicle in a direction in which the information with low reliability is detected by the at least one of the travel condition detection devices.

5. The vehicle control device according to claim 3, further comprising a travelable region derivation unit that derives a region in which the vehicle can travel around the vehicle, wherein
the travelable region derived by the travelable region derivation unit is changed according to reliability of a plurality of pieces of the information detected by the plurality of travel condition detection devices, and
a control amount of at least one of the actuators is restricted so as to restrict the travel control of the vehicle according to the travelable region.

6. The vehicle control device according to claim 1, wherein the plurality of travel condition detection devices include at least a transverse condition detection device for measuring a position of the vehicle in a transverse direction, and
a control amount of the actuator, from among the plurality of actuators, that performs travel control of the vehicle in the transverse direction is restricted when reliability of the information detected by the transverse condition detection device is low.

7. The vehicle control device according to claim 1, wherein the plurality of travel condition detection devices include at least a longitudinal condition detection device for measuring a position of the vehicle in a longitudinal direction, and
a control amount of the actuator, from among the plurality of actuators, that performs travel control of the vehicle in the longitudinal direction is restricted when reliability of the information detected by the longitudinal condition detection device is low.

8. The vehicle control device according to claim 1, wherein the plurality of electronic travel condition detection devices comprises a camera unit, a radar unit, and a car navigation system connected to a drive plan generating unit that generates a drive plan.

9. A vehicle control device comprising:
a plurality of electronic travel condition detection devices configured to detect conditions around a vehicle;
a plurality of mechanical actuators configured to enable the vehicle to travel; and
a controller that performs travel control of the vehicle according to the conditions around the vehicle by controlling the plurality of actuators, according to information detected by the travel condition detection devices, thereby assisting driving operations performed by a driver, wherein:
a control amount of at least one of the actuators, from among the plurality of actuators, is restricted according to reliability of a plurality of pieces of the information detected by the plurality of travel condition detection devices,
when a control amount of at least one of the actuators is restricted according to reliability of a plurality of pieces of the information detected by the plurality of travel condition detection devices, a control amount of another actuator, from among the plurality of actuators, is increased,
the plurality of travel condition detection devices include at least a transverse condition detection device for measuring a position of the vehicle in a transverse direction,
a control amount of the actuator, from among the plurality of actuators, that performs travel control of the vehicle in the transverse direction is restricted when reliability of the information detected by the transverse condition detection device is low, and
when a control amount of the actuator that performs travel control of the vehicle in the transverse direction is restricted due to the low reliability of the information detected by the transverse condition detection device, a control amount of the actuator, from among the plurality of actuators, that performs travel control of the vehicle in a longitudinal direction is increased.

10. A vehicle control device comprising:
a plurality of electronic travel condition detection devices configured to detect conditions around a vehicle;
a plurality of mechanical actuators configured to enable the vehicle to travel; and
a controller that performs travel control of the vehicle according to the conditions around the vehicle by controlling the plurality of actuators, according to information detected by the travel condition detection devices, thereby assisting driving operations performed by a driver, wherein:
a control amount of at least one of the actuators, from among the plurality of actuators, is restricted according to reliability of a plurality of pieces of the information detected by the plurality of travel condition detection devices,
when a control amount of at least one of the actuators is restricted according to reliability of a plurality of pieces of the information detected by the plurality of travel condition detection devices, a control amount of another actuator, from among the plurality of actuators, is increased,
the plurality of travel condition detection devices include at least a longitudinal condition detection device for measuring a position of the vehicle in a longitudinal direction,
a control amount of the actuator, from among the plurality of actuators, that performs travel control of the vehicle in the longitudinal direction is restricted when reliability of the information detected by the longitudinal condition detection device is low, and
when a control amount of the actuator that performs travel control of the vehicle in the longitudinal direction is restricted due to the low reliability of the information detected by the longitudinal condition detection device, a control amount of the actuator, from among the plurality of actuators, that performs travel control of the vehicle in the transverse direction is increased.

* * * * *